United States Patent
Jang et al.

(10) Patent No.: US 11,132,143 B2
(45) Date of Patent: Sep. 28, 2021

(54) UNIVERSAL FLASH STORAGE (UFS) DEVICE AND COMPUTING DEVICE AND COMPUTING DEVICE INCLUDING STORAGE UFS DEVICE FOR REPORTING BUFFER SIZE BASED ON REUSE TIME AFTER ERASE

(71) Applicant: SAMSUNG ELECTRONICS CO., LTD., Suwon-si (KR)

(72) Inventors: Young Joon Jang, Suwon-si (KR); Chun-Um Kong, Suwon-si (KR); Ohchul Kwon, Suwon-si (KR); Junki Kim, Suwon-si (KR); Hyung-Kyun Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 16/577,790

(22) Filed: Sep. 20, 2019

(65) Prior Publication Data

US 2020/0293221 A1    Sep. 17, 2020

(30) Foreign Application Priority Data

Mar. 14, 2019    (KR) .................. 10-2019-0029435

(51) Int. Cl.
*G06F 3/06* (2006.01)

(52) U.S. Cl.
CPC .......... *G06F 3/0656* (2013.01); *G06F 3/0604* (2013.01); *G06F 3/064* (2013.01); *G06F 3/0659* (2013.01); *G06F 3/0679* (2013.01)

(58) Field of Classification Search
CPC .... G06F 3/0604; G06F 3/0608; G06F 3/0614; G06F 3/064; G06F 3/0656; G06F 3/0659; G06F 3/0679; G06F 12/0246; G06F 2212/7203

See application file for complete search history.

(56) References Cited

U.S. PATENT DOCUMENTS

| 4,433,374 A | * | 2/1984 | Hanson ............... G06F 12/0866 |
| | | | 711/138 |
| 8,015,347 B2 | | 9/2011 | Kitsunai et al. |
| 9,158,671 B2 | | 10/2015 | Ryu et al. |
| 9,286,990 B1 | | 3/2016 | Lee et al. |
| 9,390,004 B2 | | 7/2016 | Radke et al. |
| 9,691,494 B2 | | 6/2017 | Lee |
| 10,048,892 B2 | | 8/2018 | Moon et al. |
| 2009/0006725 A1 | | 1/2009 | Ito et al. |
| 2013/0138870 A1 | | 5/2013 | Yoon et al. |

(Continued)

FOREIGN PATENT DOCUMENTS

EP    2706460 A1    3/2014

*Primary Examiner* — Larry T MacKall
(74) *Attorney, Agent, or Firm* — Sughrue Mion, PLLC

(57) ABSTRACT

A storage device includes a nonvolatile memory device that includes a plurality of memory blocks, and a controller that uses some memory blocks of the plurality of memory blocks as a buffer area. Memory blocks storing invalid data from among the some memory blocks are invalid memory blocks, and the controller identifies memory blocks, of which an elapsed time after erase is greater than a reuse time, from among the invalid memory blocks as an available buffer size, and provides the available buffer size to an external host device.

20 Claims, 18 Drawing Sheets

(56) References Cited

U.S. PATENT DOCUMENTS

| | | | |
|---|---|---|---|
| 2015/0277795 A1* | 10/2015 | Choi | G06F 3/064 |
| | | | 711/103 |
| 2016/0017872 A1 | 1/2016 | Kim et al. | |
| 2016/0077968 A1* | 3/2016 | Sela | G06F 12/0246 |
| | | | 711/118 |
| 2017/0031626 A1 | 2/2017 | Kim et al. | |
| 2017/0109276 A1* | 4/2017 | Lee | G06F 12/0253 |
| 2017/0168930 A1* | 6/2017 | Choi | G06F 3/0613 |
| 2019/0013079 A1* | 1/2019 | Blodgett | G11C 16/0408 |

* cited by examiner

UNIVERSAL FLASH STORAGE (UFS) DEVICE AND COMPUTING DEVICE AND COMPUTING DEVICE INCLUDING STORAGE UFS DEVICE FOR REPORTING BUFFER SIZE BASED ON REUSE TIME AFTER ERASE

CROSS-REFERENCE TO RELATED APPLICATIONS

This application claims priority under 35 U.S.C. § 119 to Korean Patent Application No. 10-2019-0029435 filed on Mar. 14, 2019, in the Korean Intellectual Property Office, the disclosure of which is incorporated by reference herein in its entirety.

BACKGROUND

Embodiments of the concepts described herein relate to a semiconductor device, and more particularly, to a storage device providing improved reliability by identifying an available buffer size based on a reuse time, and a computing device including the improved storage device.

A storage device refers to a device, which stores data under control of a host device, such as a computer, a smartphone, a smart pad, or the like. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

The degree of integration of the storage device and a volume thereof continues to increase as semiconductor manufacturing technologies advance. A high degree of integration of the storage device enables reduced costs necessary to manufacture the storage device. However, the high degree of integration of the storage device also causes scale-down and a structure change of the storage device. For example, damage to data stored in the storage device may occur, thereby decreasing the reliability of the storage device. Accordingly, there is a continuous demand for improving the reliability of the storage device.

SUMMARY

Embodiments of the concepts provide a storage device and a computing device capable of preventing an error from occurring in memory blocks of a buffer area due to frequent erase operations when some memory blocks are used as the buffer area.

According to an exemplary embodiment, a storage device includes a nonvolatile memory device, the nonvolatile memory device comprising a plurality of memory blocks, the plurality of memory blocks comprising first memory blocks configured to store data received from a host device and second memory blocks configured as a buffer area for writing the data received from the host device to the first memory blocks, and a controller that determines that a period of time between a time of erasing data stored in the second memory blocks of the buffer area from the second memory blocks and a current time exceeds a predetermined time, and writes the data received from the host device to the second memory blocks of the buffer area based on determining that the period of time exceeds the predetermined time.

According to an exemplary embodiment, a storage device includes a nonvolatile memory device, the nonvolatile memory device comprising a plurality of memory blocks configured as a user area comprising first memory blocks among the plurality of memory blocks and a buffer area comprising second memory blocks among the plurality of memory blocks, and a controller that receives a write command to write data to the nonvolatile memory device, the write command comprising a turbo write command of a turbo write operation to write the data into the user area through the buffer area, writes the data to the nonvolatile memory device through the buffer area according to the turbo write operation of the turbo write command based on identifying that a size of the data does not exceed an available buffer size of the buffer area, the available buffer size of the buffer area comprising a size of available memory blocks among the second memory blocks of which a period of time between a time of erasing stored data stored in the available memory blocks of the buffer area from the available memory blocks and a current time exceeds a predetermined time, and writes the data to the nonvolatile memory device according to a normal write operation of a normal write command to write the data directly into the user area based on identifying that the size of the data exceeds the available size of the buffer.

According to an exemplary embodiment, a computing device includes a storage device, the storage device comprising a user area comprising first memory blocks among memory blocks of the storage device and a buffer area comprising second memory blocks among the memory blocks of the storage device, the storage device configured to output an available size of the buffer area, the available buffer size of the buffer area comprising a size of available memory blocks among the second memory blocks of which a period of time between a time of erasing stored data stored in the available memory blocks of the buffer area from the available memory blocks and a current time exceeds a predetermined time, and a processor that transmits to the storage device a turbo write request to perform a turbo write operation to store data having a size less than or equal to the available buffer size in the user area via the buffer area and transmits to the storage device a normal write request to perform a normal write operation to store data having a size greater than the available buffer size directly into the user area.

BRIEF DESCRIPTION OF THE FIGURES

The above and other objects and features of the concepts will become apparent by describing in detail exemplary embodiments thereof with reference to the accompanying drawings.

DETAILED DESCRIPTION

Below, embodiments may be described in detail and clearly to such an extent that an ordinary one in the art easily implements the concepts described herein.

Figure 1:
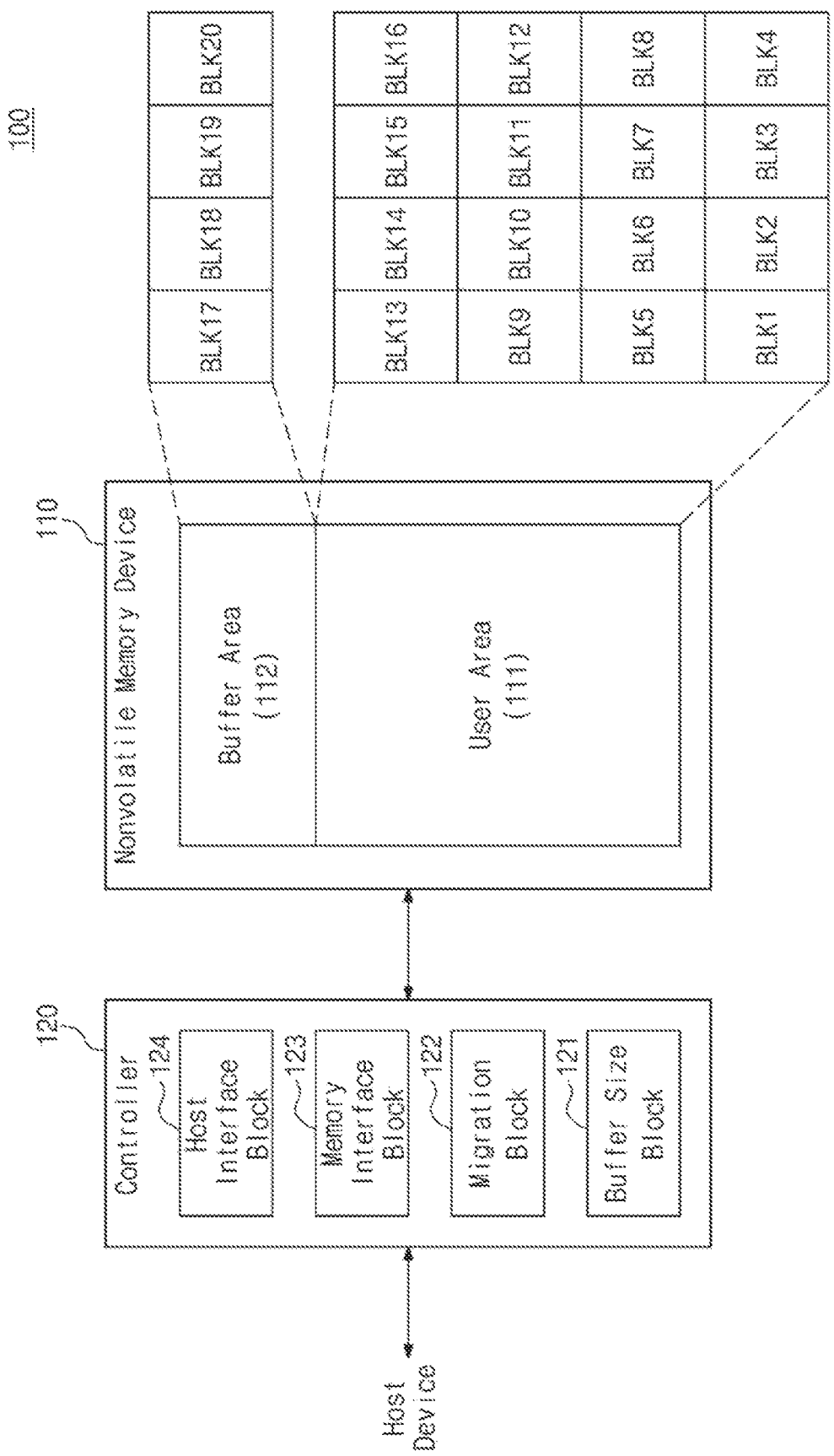
FIG. 1 illustrates a storage device according to an embodiment.

FIG. 1 illustrates a storage device 100 according to an embodiment. Referring to FIG. 1, the storage device 100 may include a nonvolatile memory device 110 and a controller 120.

The nonvolatile memory device 110 is configured to perform a write operation, a read operation, and an erase operation under control of the controller 120. The nonvolatile memory device 110 may include a plurality of memory blocks that are configured to store data. For example, the nonvolatile memory device 110 may include first to twentieth memory blocks BLK1 to BLK20. However, the number of memory blocks included in the nonvolatile memory device 110 is merely exemplary, and the nonvolatile memory device 110 may include any number of memory blocks.

The nonvolatile memory device 110 may perform the erase operation in the unit of a memory block. For example, the nonvolatile memory device 110 may independently erase the first to twentieth memory blocks BLK1 to BLK20 under control of the controller 120.

Each of the first to twentieth memory blocks BLK1 to BLK20 may include a plurality of memory cells. The nonvolatile memory device 110 may perform the write operation and the read operation in a unit smaller than a memory block. For example, under control of the controller 120, the nonvolatile memory device 110 may select some of memory cells of a certain memory block and may perform the write operation or the read operation on the selected memory cells.

The controller 120 may control the nonvolatile memory device 110 under control of an external host device. For example, the controller 120 may direct the nonvolatile memory device 110 to perform the read operation, the write operation, or the erase operation. The controller 120 may set, partition, or otherwise configure a portion of the first to twentieth memory blocks BLK1 to BLK20 of the nonvolatile memory device 110 as a user area 111 and may utilize the remaining portion thereof as a buffer area 112.

For example, the controller 120 may select the first to sixteenth memory blocks BLK1 to BLK16 as the user area 111 and may select the seventeenth to twentieth memory blocks BLK17 to BLK20 as the buffer area 112. The controller 120 may provide a storage space of the first to sixteenth memory blocks BLK1 to BLK16 of the user area 111 to the external host device.

The controller 120 may provide a storage space of the seventeenth to twentieth memory blocks BLK17 to BLK20 of the buffer area 112 as a buffer of the user area 111. For example, the controller 120 may not provide the storage space of the seventeenth to twentieth memory blocks BLK17 to BLK20 of the buffer area 112 to be accessible for storage to the external host device.

The controller 120 may include a buffer size block 121, a migration block 122, a memory interface block 123, and a host interface block 124. The buffer size block 121, the migration block 122, the memory interface block 123, and the host interface block 124 may be modules of the controller 120 configured to execute operations of the controller 120.

The buffer size block 121 may identify a currently usable capacity of the storage space of the seventeenth to twentieth memory blocks BLK17 to BLK20 of the buffer area 112. For example, the controller 120 may identify storage space available in the seventeenth to twentieth memory blocks BLK17 to BLK20 of the buffer area 112, in which data is not written, as an available buffer size, in response to a request of the external host device or periodically.

The migration block 122 may migrate valid data written into the seventeenth to twentieth memory blocks BLK17 to BLK20 of the buffer area 112 to the user area 111, in response to a request of the external host device or at an idle time. The data that are migrated from the buffer area 112 to the user area 111 may be invalidated in the buffer area 112 and may be identified as invalid or dirty data.

In response to a request of the external host device or in compliance with an internal schedule, the memory interface block 123 may provide a command, an address, or data to the nonvolatile memory device 110 such that the nonvolatile memory device 110 performs the write operation, the read operation, or the erase operation.

The host interface block 124 may receive various requests from the external host device. The host interface block 124 may parse requests received from the external host device. Based on a result of the parsing, the host interface block 124 may control the nonvolatile memory device 110 or may provide information to the external host device. For example, the host interface block 124 may provide the available buffer size identified by the buffer size block 121 to the external host device.

Figure 2:
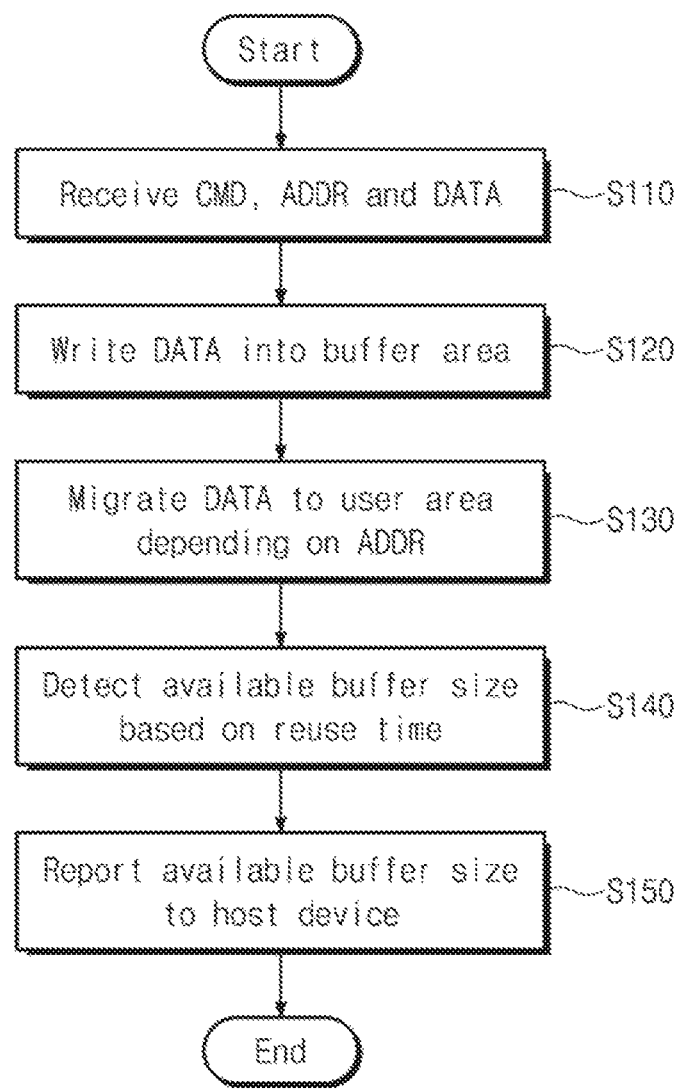
FIG. 2 illustrates a method of operating a storage device according to an embodiment.

FIG. 2 illustrates a method of operating the storage device 100 according to an embodiment. Referring to FIGS. 1 and 2, in operation S110, the host interface block 124 of the controller 120 may receive a command CMD, an address ADDR, and data "DATA" from the external host device. For example, the command CMD may be a write command, a read command, or an erase command.

The address ADDR may indicate a location where the data "DATA" is to be stored. For example, the location where data DATA is to be stored may be a location on the user area 111 of the nonvolatile memory device 110. The data "DATA" may be write data that the external host device intends to write into the nonvolatile memory device 110.

In operation S120, the memory interface block 123 of the controller 120 may write the data "DATA" into the buffer area 112. For example, a location on the buffer area 112, at which the data "DATA" will be written, may be unrelated to the address ADDR at which the data DATA will ultimately be written in the user area 111. The nonvolatile memory device 110 may write the data "DATA" by using memory cells of the buffer area 112 as single level cells SLC, thus improving a speed of writing the data to the nonvolatile memory device 110.

In operation S130, when a migration request is received from the external host device or at an idle time when a request from the external host device does not exist, the migration block 122 of the controller 120 may initiate data migration. Under control of the migration block 122, the controller 120 may migrate (or move) data written into the buffer area 112 to the location on the user area 111 indicated by the address ADDR.

For example, the memory interface block 123 of the controller 120 may transmit a read command and an address of the buffer area 112 to the nonvolatile memory device 110 and may read the data "DATA" written into the buffer area 112. Afterwards, the memory interface block 123 of the controller 120 may transmit a write command and the address ADDR to the nonvolatile memory device 110 and may write the data "DATA" into the user area 111.

In operation S140, the buffer size block 121 of the controller 120 may detect (or identify) the available buffer size of the buffer area 112 based on a reuse time, when a request is received from the external host device or periodically (or at a certain period).

For example, the data "DATA" of the buffer area 112 may be invalidated by moving the data "DATA" from the buffer area 112 to the user area 111 in operation S130. Memory blocks of the buffer area 112, which store the data "DATA," may be invalid memory blocks.

The buffer size block 121 may identify a capacity of memory blocks, in which an erase operation is currently possible and data are able to be written, from among the invalid memory blocks of the buffer area 112, as the available buffer size. The available buffer size may not coincide with the total capacity of the invalid memory blocks of the buffer area 112. The buffer size block 121 may determine whether any of the invalid memory blocks is included in the available buffer size and any is not included in the available buffer size, by using the reuse time.

In operation S150, the host interface block 124 of the controller 120 may report to the external host device on the available buffer size. Operation S140 and operation S150 may be sequentially performed in response to a request of the host device that requests the available buffer size.

Figure 3:
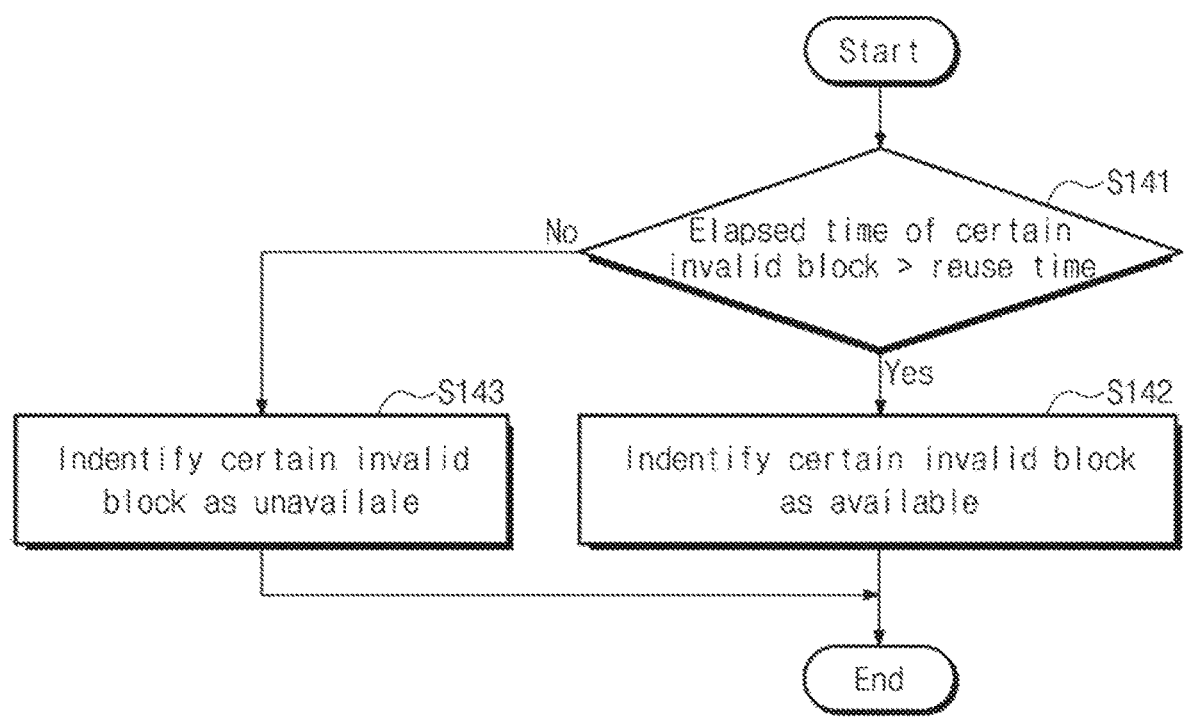
FIG. 3 illustrates a method of identifying an available buffer size according to an embodiment.

FIG. 3 illustrates a method of identifying an available buffer size according to an embodiment. Referring to FIGS. 1 to 3, in operation S141, the buffer size block 121 may determine whether a time (e.g., an elapsed time) that elapses after a certain invalid memory block of the seventeenth to twentieth memory blocks BLK17 to BLK20 in the buffer area 112 is erased is greater than the reuse time.

When the elapsed time is greater than the reuse time, in operation S142, the certain invalid memory block may be identified as an available memory block that is available for storing data in the buffer area 112. A capacity of the invalid memory block marked as available may be included in calculation of the available buffer size. When the elapsed time is not greater than the reuse time, in operation S143, the invalid memory block may be identified as an unavailable memory block that is unavailable for storing data in the buffer area 112. The capacity of the invalid memory block marked as unavailable may not be included in calculation of the available buffer size.

In general, a memory cell, for example, a flash memory cell has a structure in which a body, a tunneling insulating layer, an information storage layer, a blocking insulating layer, and a control gate are stacked. In the write operation, a high voltage is applied to the control gate, and a low voltage is applied to the body. According to this write bias condition, charges of the body are injected into the information storage layer through the tunneling insulating layer. This injection of the charges may make a threshold voltage of a memory cell high.

In the erase operation, the low voltage is applied to the control gate, and the high voltage is applied to the body. According to this erase bias condition, charges of the information storage layer are pulled off and transferred to the body through the tunneling insulating layer. This transfer of the charges may lower a threshold voltage of a memory cell.

When the write operation or the erase operation is performed, some charges may be trapped in the tunneling insulating layer or the blocking insulating layer. The charges that are trapped in the tunneling insulating layer or the blocking insulating layer are discharged over time. That is, the charges trapped in the tunneling insulating layer or the blocking insulating layer may have an influence on a threshold voltage of a memory cell immediately after the write operation or the erase operation is performed.

When the charges that are trapped in the tunneling insulating layer or the blocking insulating layer are discharged over time, the threshold voltage of the memory cell may change due to presence of the trapped charges. The process in which the charges that are trapped in the tunneling insulating layer or the blocking insulating layer are discharged may be considered as the memory cell is cured or stabilized.

When the write operation and the erase operation are performed on a certain memory block, the curing or stabilization may cause a first change in threshold voltages of memory cells in the certain memory block as much as a first level. In the case that the erase operation or the write operation is again performed before the curing or stabilization of the certain memory block is completed, in addition to the first change in threshold voltages caused in the previous erase and write operations, the current write and erase operations accompanying the curing or stabilization may cause a second change in threshold voltages.

As such, the first change and the second change are accumulated, thereby causing a greater change in the threshold voltages of the memory cells. As the change in the threshold voltages of the memory cells increases (or as a shift of the threshold voltages of the memory cells becomes greater), the probability that an uncorrectable error occurs in data written into the certain memory block may also increase.

In particular, as an example considering the seventeenth to twentieth memory blocks BLK17 to BLK20 of the buffer area 112, in the case that the limited number of memory blocks are used to store a single bit per memory cell, the probability that the erase operation and the write operation are triggered before the curing or stabilization is completed may be with regard to the memory blocks BLK17 to BLK20 of the buffer area 112.

For example, before the curing or stabilization of the buffer area 112 is completed, the external host device may intend to write data into the buffer area 112, to migrate the written data to the user area 111, and to further write any other data into the buffer area 112.

The storage device 100 according to an embodiment may include a memory block, of which the elapsed time after erase is greater than the reuse time, from among the seventeenth to twentieth memory blocks BLK17 to BLK20 of the buffer area 112 in the available buffer size. For example, the elapsed time may be a time over which charges that are trapped in the tunneling insulating layer or the blocking insulating layer are likely to be discharged over time. The elapsed time may be a predetermined time against which availability or unavailability of the memory block is judged. The storage device 100 may exclude a memory block, of which the elapsed time after erase is not greater than the reuse time, from the available buffer size. Accordingly, a memory block in which charges that are trapped in the tunneling insulating layer or the blocking insulating layer may not have been discharged over time is not be included in the calculation of the available buffer size.

The reuse time may be determined based on a time when the seventeenth to twentieth memory blocks BLK17 to BLK20 are cured or stabilized. Such memory blocks may be indicated as available memory blocks. That is, the storage device 100 may support a fast write operation by using the buffer area 112 for those memory blocks indicated as available and may secure the curing or stabilization of the buffer area 112 for those memory blocks indicated as unavailable, and thus, the reliability of the storage device 100 is improved.

Figure 4:
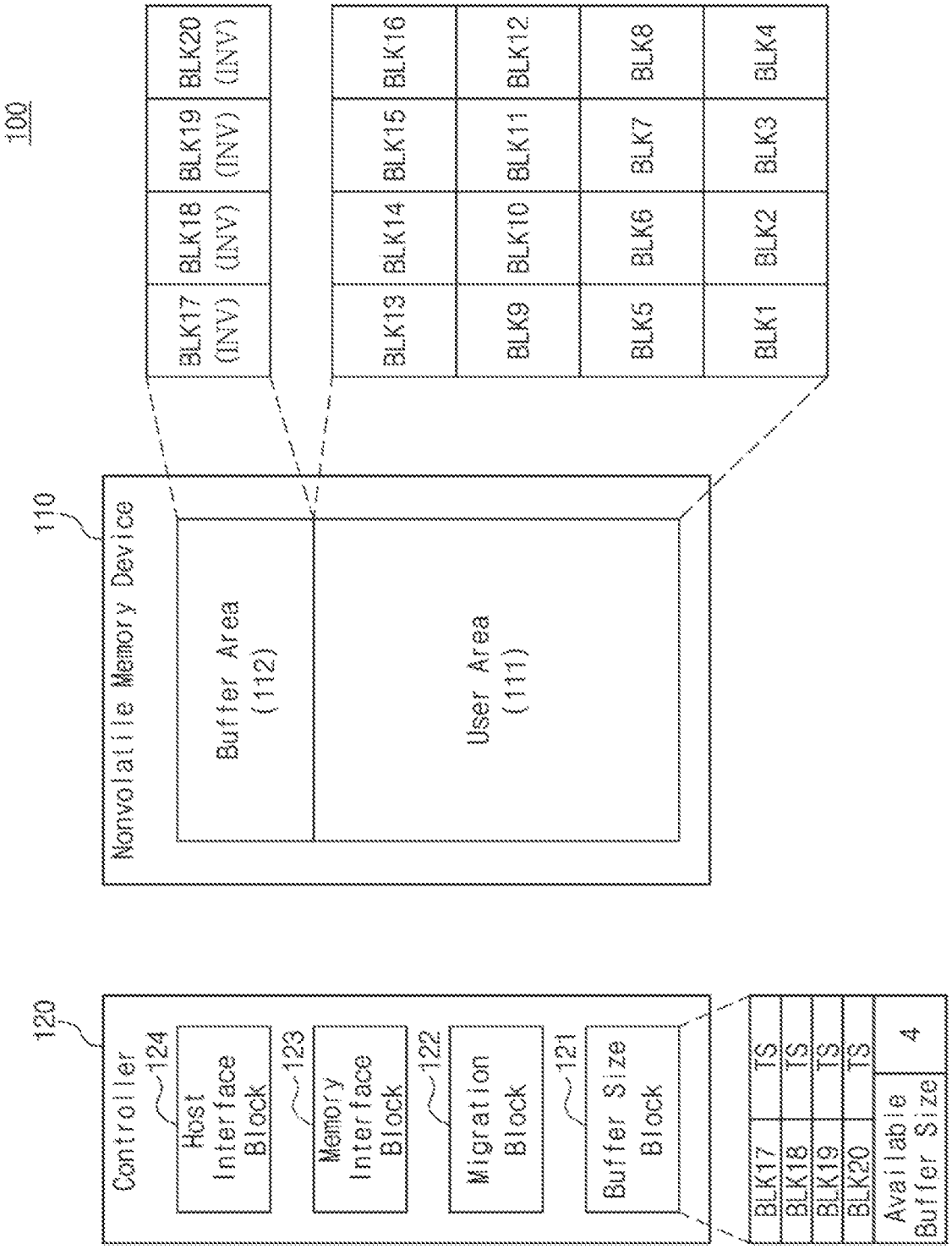
FIG. 4 illustrates a state of a storage device before storing data in a buffer area according to an embodiment.

FIGS. 4 to 8 illustrate how the storage device 100 manages the buffer area 112 based on the reuse time. FIG. 4 illustrates a state of a storage device before storing in the buffer area 112. Referring to FIG. 4, the seventeenth to twentieth memory blocks BLK17 to BLK20 of the buffer area 112 may be invalid memory blocks storing invalid data INV.

The buffer size block 121 may manage a time stamp TS of each of the seventeenth to twentieth memory blocks BLK17 to BLK20. The time stamp TS may indicate a time when each of the seventeenth to twentieth memory blocks BLK17 to BLK20 is previously erased. It is assumed that the curing or stabilization of the seventeenth to twentieth memory blocks BLK17 to BLK20 is completed. That is, the time stamp TS of each of the seventeenth to twentieth memory blocks BLK17 to BLK20 and an elapsed time calculated from a current time may be greater than the reuse time. Therefore, the seventeenth to twentieth memory blocks BLK17 to BLK20 of the buffer area 112 may be indicated as available memory blocks.

The buffer size block 121 may further manage the available buffer size. Because the curing or stabilization of the seventeenth to twentieth memory blocks BLK17 to BLK20 is completed, the available buffer size may be "4" (meaning a size of four memory blocks). However, the available buffer size is not limited to the number of memory blocks. The available buffer size may be expressed by a capacity of data to be actually written, such as B, KB, MB, GB, or TB.

Figure 5:
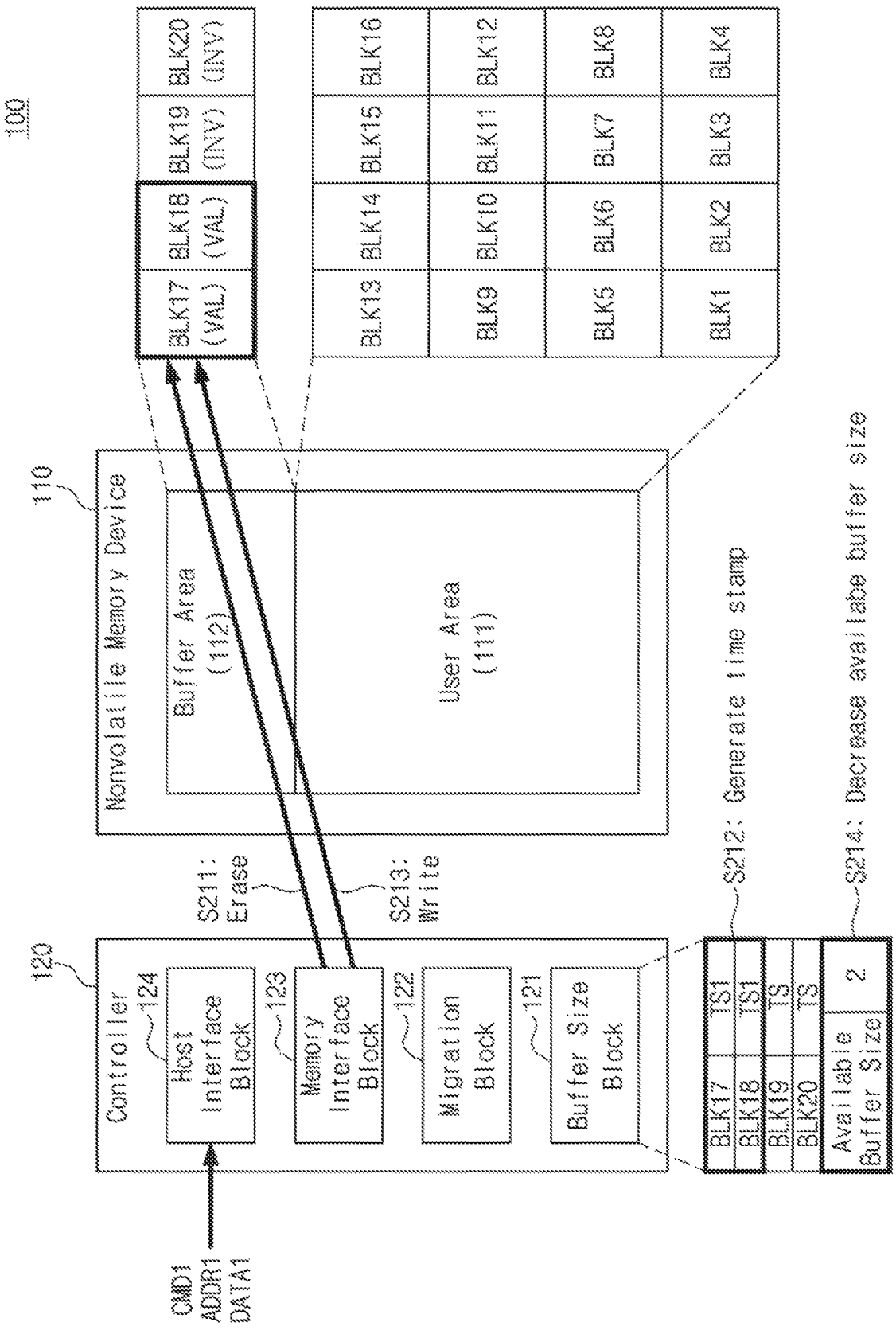
FIG. 5 illustrates a state of a storage device in which data are written into a portion of a buffer area according to an embodiment.

FIG. 5 illustrates a state of a storage device in which data are written into a portion of the buffer area 112. The host interface block 124 of the controller 120 may receive a first command CMD1, a first address ADDR1, and first data DATA1 from the external host device. The first command CMD1 may be a write command. The first address ADDR1 may correspond to, for example, memory block thirteen BLK13 of the user area 111.

In operation S211, the memory interface block 123 of the controller 120 may transmit an erase command and an address indicating the seventeenth and eighteenth memory blocks BLK17 and BLK18 of the buffer area 112 to the nonvolatile memory device 110. The nonvolatile memory device 110 may erase the seventeenth and eighteenth memory blocks BLK17 and BLK18.

In operation S212, when the seventeenth and eighteenth memory blocks BLK17 and BLK18 are erased, the buffer size block 121 may generate a first time stamp TS1 of a time when the seventeenth and eighteenth memory blocks BLK17 and BLK18 are erased and may record the first time stamp TS1 in association with the seventeenth and eighteenth memory blocks BLK17 and BLK18. For example, the buffer size block 121 may store the time stamp TS in association with the corresponding memory block in a lookup table, a register, or any other storage mechanism.

In operation S213, the memory interface block 123 of the controller 120 may transmit a write command, an address indicating the seventeenth and eighteenth memory blocks BLK17 and BLK18 of the buffer area 112, and the first data DATA1 to the nonvolatile memory device 110. The nonvolatile memory device 110 may write the first data DATA1 into the seventeenth and eighteenth memory blocks BLK17 and BLK18. The seventeenth and eighteenth memory blocks BLK17 and BLK18 may be indicated as valid memory blocks storing valid data VAL.

In operation S214, because the seventeenth and eighteenth memory blocks BLK17 and BLK18 become valid memory blocks, the buffer size block 121 may decrease the available buffer size. For example, the available buffer size may decrease to "2" corresponding to only the nineteenth and twentieth memory blocks BLK19 and BLK20 being invalid memory blocks that are available.

Figure 6:
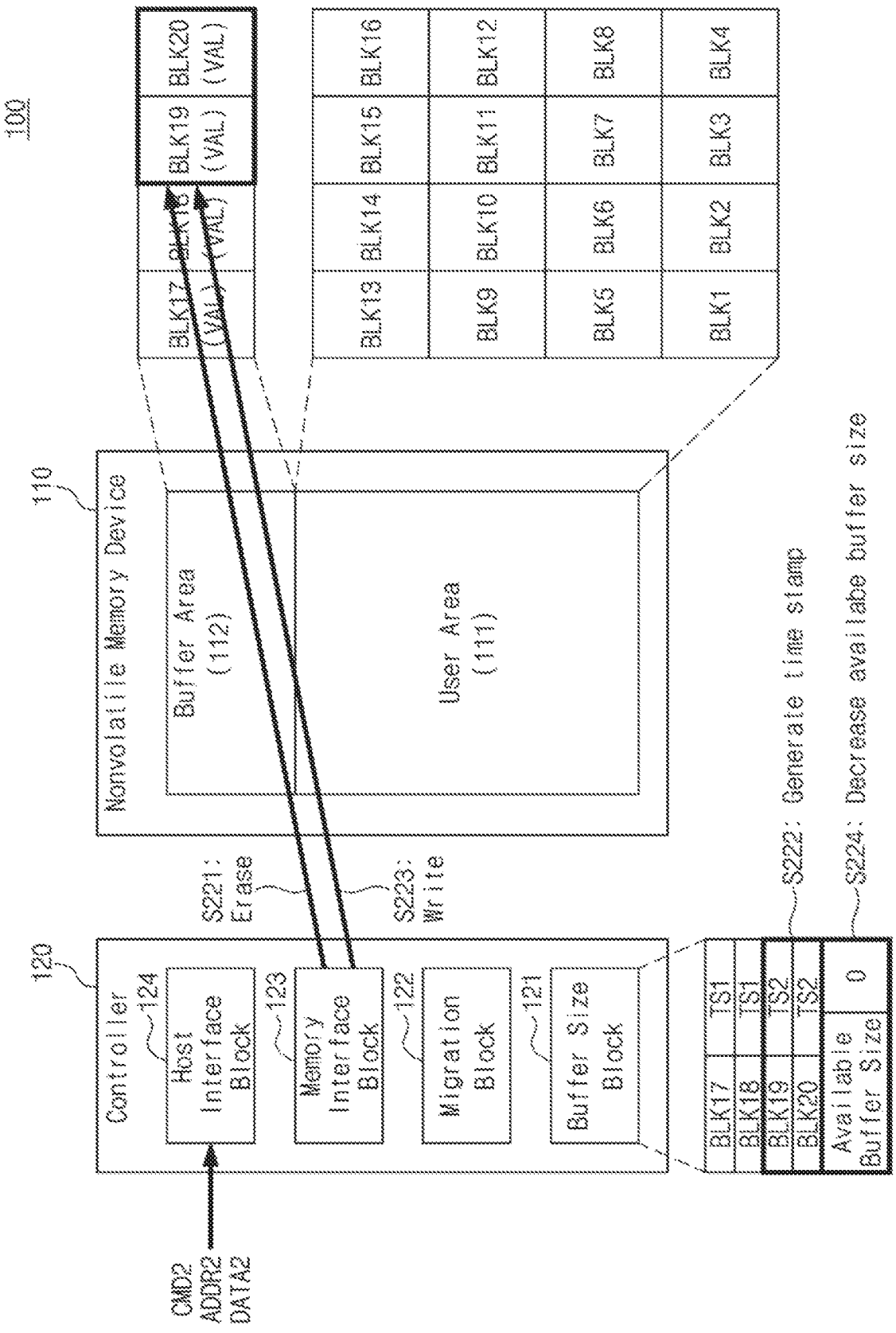
FIG. 6 illustrates a state of a storage device in which data are written into a remainder of a buffer area according to an embodiment.

FIG. 6 illustrates a state of a storage device in which data are written into a remainder of the buffer area 112. The host interface block 124 of the controller 120 may receive a second command CMD2, a second address ADDR2, and second data DATA2 from the external host device. The second command CMD2 may be a write command. The second address ADDR2 may correspond to, for example, the fourteenth memory block BLK14 of the user area 111.

In operation S221, the memory interface block 123 of the controller 120 may transmit an erase command and an address indicating the nineteenth and twentieth memory blocks BLK19 and BLK20 of the buffer area 112 to the nonvolatile memory device 110. The nonvolatile memory device 110 may erase the nineteenth and twentieth memory blocks BLK19 and BLK20.

In operation S222, when the nineteenth and twentieth memory blocks BLK19 and BLK20 are erased, the buffer size block 121 may generate a second time stamp TS2 of when the nineteenth and twentieth memory blocks BLK19 and BLK20 are erased and may record the second time stamp TS2 in association with the nineteenth and twentieth memory blocks BLK19 and BLK20.

In operation S223, the memory interface block 123 of the controller 120 may transmit a write command, an address indicating the nineteenth and twentieth memory blocks BLK19 and BLK20 of the buffer area 112, and the second data DATA2 to the nonvolatile memory device 110. The nonvolatile memory device 110 may write the second data DATA2 into the nineteenth and twentieth memory blocks BLK19 and BLK20. The nineteenth and twentieth memory blocks BLK19 and BLK20 may be valid memory blocks storing valid data VAL.

In operation S224, because the nineteenth and twentieth memory blocks BLK19 and BLK20 become valid memory blocks, the buffer size block 121 may decrease the available buffer size. For example, because all memory blocks of the buffer area 112 are valid memory blocks, the available buffer size may decrease to "0."

Figure 7:
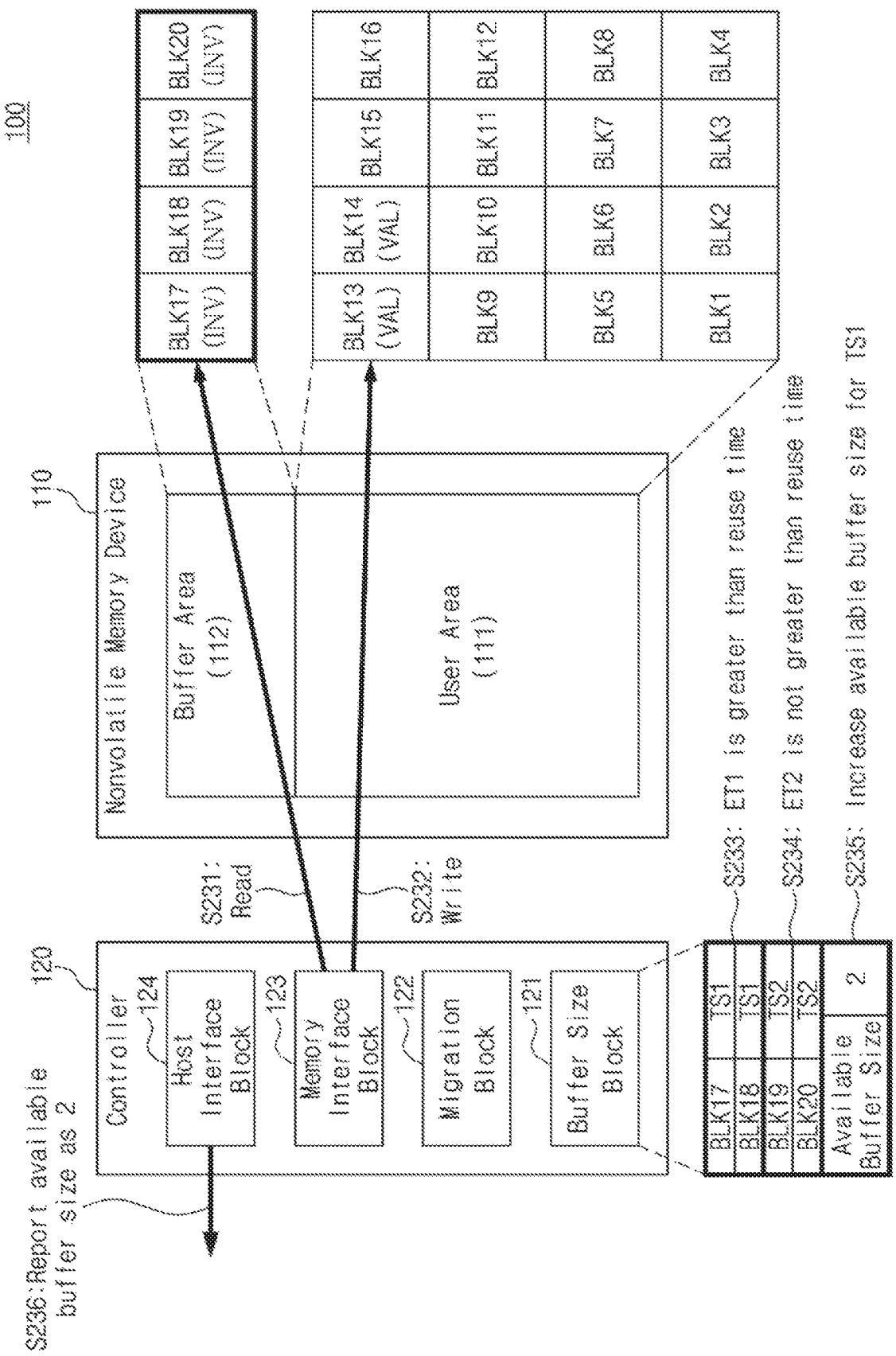
FIG. 7 illustrates a state of a storage device in which data written into a buffer area is migrated to a user area according to an embodiment.

FIG. 7 illustrates a state of a storage device in which data written into the buffer area 112 is migrated to the user area 111. Referring to FIG. 7, the migration block 122 of the controller 120 may initiate a migration operation in response to a request of the external host device or at an idle time when a command from the external host device does not exist.

In operation S231, the memory interface block 123 may transmit a read command and an address indicating the seventeenth to twentieth memory blocks BLK17 to BLK20 of the buffer area 112 to the nonvolatile memory device 110. The nonvolatile memory device 110 may read the first data DATA1 from the seventeenth and eighteenth memory blocks BLK17 and BLK18 and may read the second data DATA2 from the nineteenth and twentieth memory blocks BLK19 and BLK20. The nonvolatile memory device 110 may transmit the first data DATA1 and the second data DATA2 to the controller 120.

In operation S232, the memory interface block 123 may transmit a write command, the first address ADDR1 indicating the thirteenth memory block BLK13, and the first data DATA1 to the nonvolatile memory device 110. Also, the memory interface block 123 may transmit a write command, the second address ADDR2 indicating the fourteenth memory block BLK14, and the second data DATA2 to the nonvolatile memory device 110.

The nonvolatile memory device 110 may write the first data DATA1 into the thirteenth memory block BLK13 and may write the second data DATA2 into the fourteenth memory block BLK14. For example, the memory interface block 123 may utilize memory cells of the thirteenth and fourteenth memory blocks BLK13 and BLK14 of the user area 111 as multi-level cells MLC.

However, the memory cells of the user area 111 are not limited to multi-level cells MLC. The memory cells of the user area 111 may be utilized as triple level cells TLC or quadruple level cells QLC.

As the first data DATA1 and the second data DATA2 migrate, the first data DATA1 and the second data DATA2 written into the buffer area 112 are invalidated. The seventeenth to twentieth memory blocks BLK17 to BLK20 of the buffer area 112 may be invalid memory blocks storing invalid data INV. The thirteenth and fourteenth memory blocks BLK13 and BLK14 of the user area 111 may be valid memory blocks storing valid data VAL.

In operation S233 and operation S234, in response to a request of the external host device or in compliance with an internal schedule (e.g., periodically or when a certain condition is satisfied), the buffer size block 121 may compare a time stamp of each of the seventeenth to twentieth memory blocks BLK17 to BLK20 with a current time and may determine the available buffer size based on a result of the comparison.

For example, in operation S233, the seventeenth and eighteenth memory blocks BLK17 and BLK18 have the first time stamp TS1. A difference between the first time stamp TS1 and the current time, that is, an elapsed time ET1 of the seventeenth and eighteenth memory blocks BLK17 and BLK18 may be greater than the reuse time. Thus, the memory blocks BLK17 and BLK18 may be indicated as available.

In contrast, in operation S234, the nineteenth and twentieth memory blocks BLK19 and BLK20 have the second time stamp TS2. A difference between the second time stamp TS2 and the current time, that is, an elapsed time ET2 of the nineteenth and twentieth memory blocks BLK19 and BLK20 may be not greater than the reuse time. Thus, the memory blocks BLK19 and BLK20 may be indicated as unavailable.

The buffer size block 121 may identify the seventeenth and eighteenth memory blocks BLK17 and BLK18 as available memory blocks of the buffer area 112 and may identify the nineteenth and twentieth memory blocks BLK19 and BLK20 as unavailable memory blocks of the buffer area 112. Accordingly, the number of invalid memory blocks of the buffer area 112 may be "4"; however, in operation S235, the available buffer size identified by the buffer size block 121 may be "2."

In operation S236, the host interface block 124 may report the available buffer size to the external host device. For example, the identification and report of the available buffer size may be performed in response to one identical command or different, separate commands, which are provided from the external host device.

Figure 8:
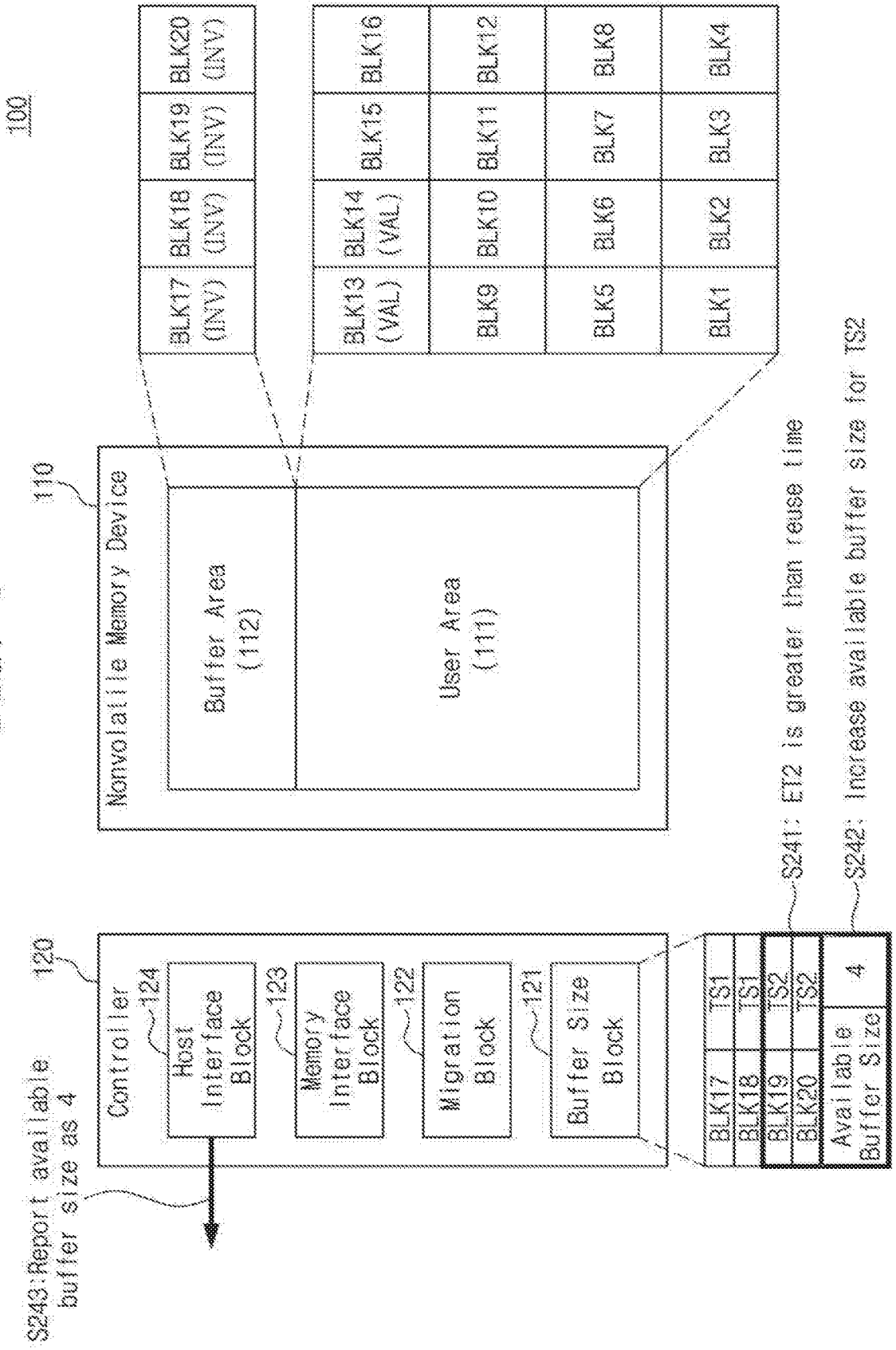
FIG. 8 illustrates a state of a storage device which determines an available buffer size according to an embodiment.

FIG. 8 illustrates a state of a storage device which determines an available buffer size. Referring to FIG. 8, in response to a request of the external host device or in compliance with an internal schedule (e.g., periodically or when a certain condition is satisfied), the buffer size block 121 may compare a time stamp of each of the seventeenth to twentieth memory blocks BLK17 to BLK20 with a current time and may determine an available buffer size based on a result of the comparison.

For example, in operation S241, the nineteenth and twentieth memory blocks BLK19 and BLK20 have the second time stamp TS2. A difference between the second time stamp TS2 and the current time, that is, an elapsed time ET2 of the nineteenth and twentieth memory blocks BLK19 and BLK20 may be greater than the reuse time.

The nineteenth and twentieth memory blocks BLK19 and BLK20 may be identified as available memory blocks of the buffer area 112. Accordingly, in operation S242, the available buffer size identified by the buffer size block 121 may be "4."

In operation S243, the host interface block 124 may report the available buffer size to the external host device. For example, the identification and report of the available buffer size may be performed in response to one identical command or different, separate commands, which are provided from the external host device.

Figure 9:
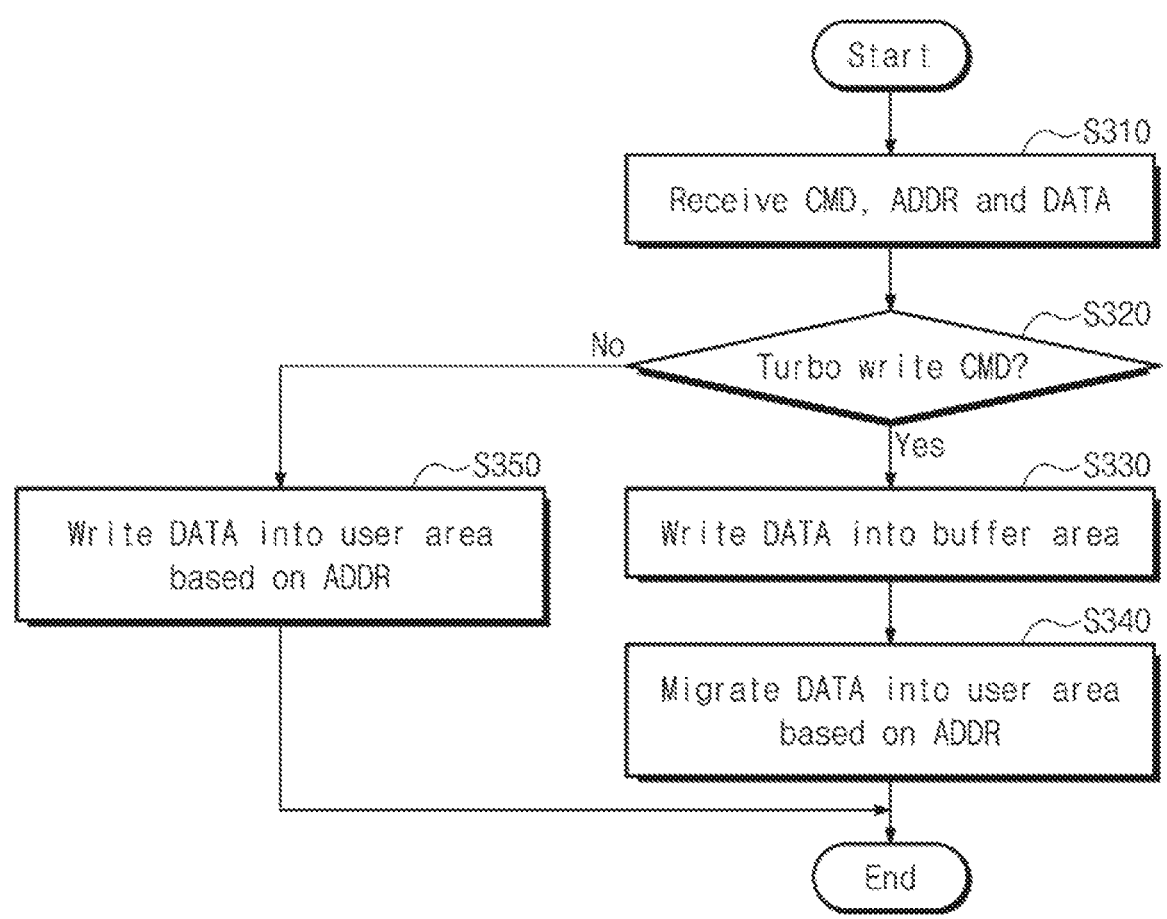
FIG. 9 illustrates a method of a storage device performs write operations for a buffer area and a user area according to an embodiment.

FIG. 9 illustrates a method of the storage device 100 performing write operations for the user area 111 and the buffer area 112. Referring to FIGS. 1 and 9, in operation S310, the host interface block 124 of the controller 120 may receive the command CMD, the address ADDR, and the data "DATA" from the external host device. The command CMD may be a write command. The address ADDR may indicate a certain storage location of the user area 111.

In operation S320, the host interface block 124 may determine whether the received command CMD is a turbo write command. When the received command CMD is the turbo write command, in operation S330 and operation S340, the controller 120 may perform a turbo write operation of writing the data "DATA" relatively quickly.

For example, in operation S330, the memory interface block 123 may write the received data "DATA" into the buffer area 112. Because the memory cells of the buffer area 112 are used as single level cells SLC, a speed at which the data "DATA" are written may be relatively fast. Afterwards, in operation S340, in response to a request of the external host device or at an idle time, the memory interface block 123 may migrate the data "DATA" written into the buffer area 112 to the user area 111 based on the address ADDR.

When it is determined in operation S320 that the received write command is not the turbo write command, that is, the received write command is a typical/normal write command, operation S350 is performed. In operation S350, the controller 120 may perform a normal write operation of writing the data "DATA" to memory, which may be slower than the turbo write operation. The memory interface block 123 may directly write the data "DATA" into the user area 111 based on the address ADDR, without using the buffer area 112.

That is, the storage device 100 may allow the host device to select the turbo write operation that uses the buffer area 112 and the normal write operation that does not use the buffer area 112. When a large amount of write data is generated, for example in the case of storing image data, the external host device may select the turbo write operation to perform fast data processing. When the small amount of write data is generated, for example in the case of storing document data, the external host device may select the normal write operation to allow a margin for a resource of the buffer area 112. Alternatively, the storage device 100 may control whether to select the turbo write operation and the normal write operation, based on the available size of the buffer area 112 and the size of the data DATA. If the size of the data DATA is less than the available size of the buffer, then the storage device 100 may perform a turbo write operation. If the size of the data DATA is greater than the available size of the buffer, then the storage device may perform a normal write operation. Alternatively, if the size of the data DATA is greater than the available size of the buffer, then the storage device may split the data DATA, and perform a turbo write operation on a portion of the data DATA and a normal write operation on a portion of the data DATA, as will described with respect to FIG. 17.

Figure 10:
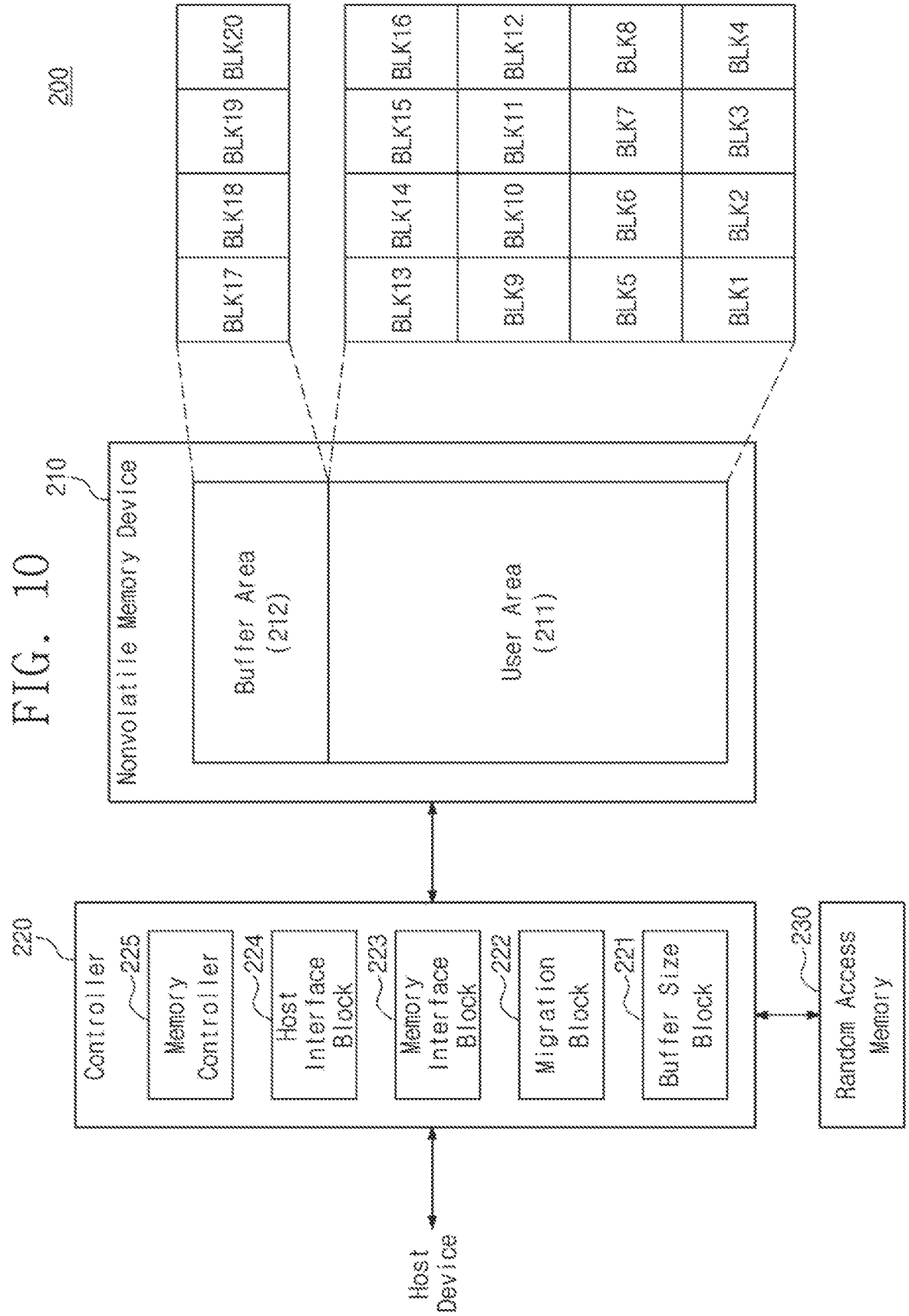
FIG. 10 illustrates a storage device according to an embodiment.

FIG. 10 illustrates a storage device 200 according to an embodiment. Referring to FIG. 10, the storage device 200 includes a nonvolatile memory device 210, a controller 220, and a random access memory 230.

As described with reference to FIG. 1, the nonvolatile memory device 210 may include a user area 211 and a buffer area 212. As described with reference to FIG. 2, the controller 220 may include a buffer size block 221, a migration block 222, a memory interface block 223, and a host interface block 224. In addition, the controller 220 may further include a memory controller 225.

The memory controller 225 may be configured to control the random access memory 230. The storage device 200 may use the random access memory 230 as a buffer between the nonvolatile memory device 210 and the external host device. The controller 220 may store data received from the external host device into the random access memory 230.

The controller 220 may write data stored in the random access memory 230 into the nonvolatile memory device 210. In this case, as described with reference to FIG. 9, the controller 220 may select one of the turbo write operation and the normal write operation. The buffer size block 221 may identify the available buffer size of the buffer area 212 as described with reference to FIGS. 1 to 8.

The controller 220 may not provide the available buffer size to the external host device and may internally use the available buffer size. The controller 220 may refer to the available buffer size when writing the write data stored in the random access memory 230 into the buffer area 212 through the turbo write operation. For example, the controller 220 may write data, the size of which is less than or equal to the available buffer size, into the buffer area 212 through the turbo write operation.

The controller 220 may store data read from the nonvolatile memory device 210 into the random access memory 230. The controller 220 may transmit the data stored in the random access memory 230 to the external host device.

Figure 11:
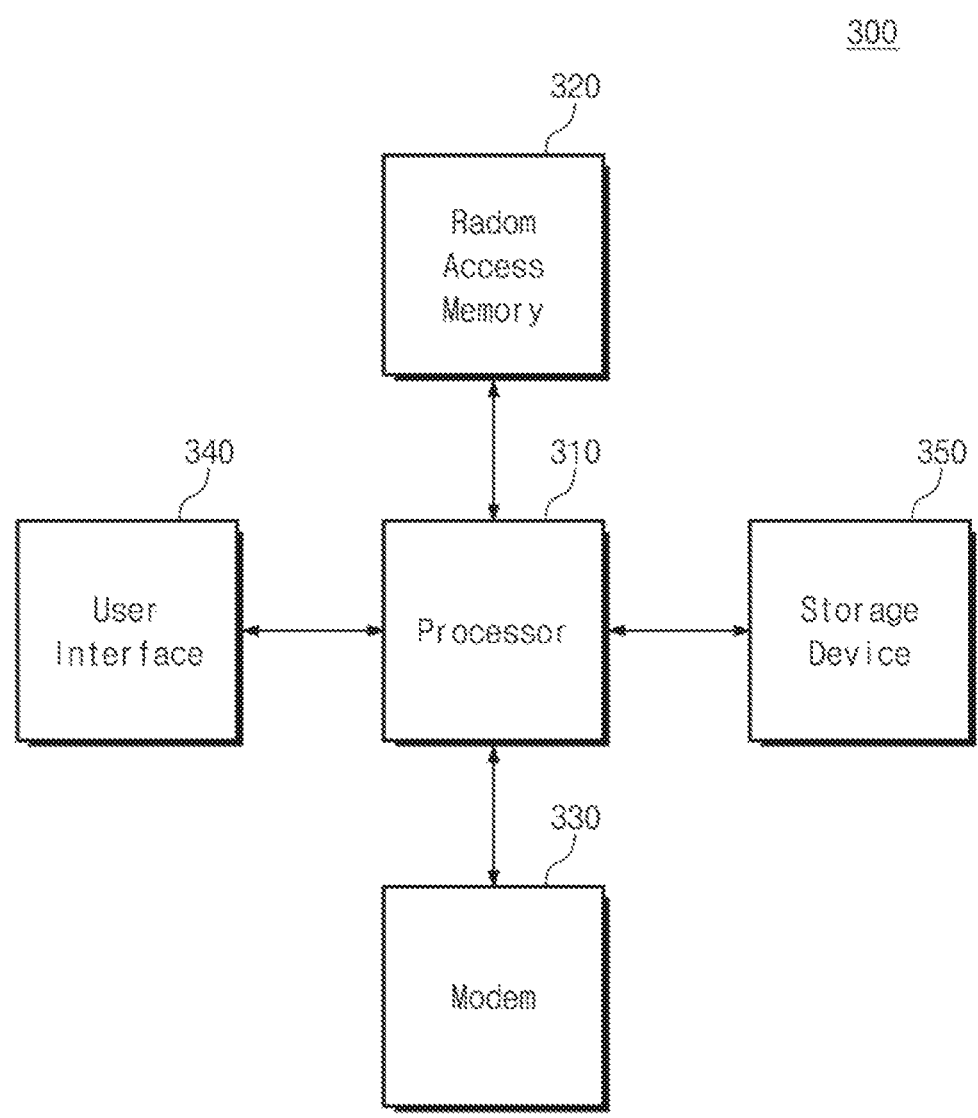
FIG. 11 illustrates a computing device according to an embodiment.

FIG. 11 illustrates a computing device 300 according to an embodiment. Referring to FIG. 11, the computing device 300 may be implemented as a mobile device such as a smartphone, a smart pad, or a notebook computer, or a fixed device such as a computer, a workstation, or a server.

The computing device 300 includes a processor 310, a random access memory 320, a modem 330, a user interface 340, and a storage device 350. The processor 310 may execute an operating system necessary to drive the computing device 300, and various applications executable on the operating system. The processor 310 may be a host device of the storage device 350.

For example, the processor 310 may read program codes of the operating system and the applications from the storage device 350 and may store the loaded codes into the random access memory 320. The processor 310 may execute the operating system and the applications by executing the codes stored in the random access memory 320. The processor 310 may include a central processing unit (CPU) or an application processor (AP).

The random access memory 320 may be used as a system memory or a working memory of the computing device 300. The random access memory 320 may store various codes to be executed by the processor 310. The random access memory 320 may store user data that are generated by the operating system or the applications of the processor 310.

The random access memory 320 may store data received from an external device through the modem 330 or data to be transmitted to the external device through the modem 330. The random access memory 320 may store data input from an external user through the user interface 340 or data to be output to the external user through the user interface 340.

The random access memory 320 may include a dynamic random access memory (DRAM), a static random access memory (SRAM), a phase-change RAM (PRAM), a magnetic RAM (MRAM), a ferroelectric RAM (FRAM), a magnetic RAM (MRAM), a resistive RAM (RRAM), etc.

The modem 330 is a communication interface configured to perform wired or wireless communication with an external device. The modem 330 may communicate with the external device based on at least one of various standards such as Ethernet, long term evolution (LTE), $5^{th}$ generation (5G) mobile communication, wireless-fidelity Bluetooth, and near field communication (NFC).

The user interface 340 is configured to exchange information with the user. The user interface 340 may include user input devices, which are able to receive information from a user, such as a keyboard, a mouse, a touch pad, a touch panel, a microphone. The user interface 340 may include user output devices, which are able to provide information to the user, such as a monitor, a beam projector, a speaker, and a motor.

The storage device 350 may be used to store the codes of the operating system and the applications, and user data. The storage device 350 may be a disk and may include the storage device 100 described with reference to FIGS. 1 to 10. The storage device 350 may identify memory blocks, of which the elapsed time after erase is greater than the reuse time, from among invalid memory blocks of the buffer area 112 or 212 as an available buffer.

As described with reference to FIGS. 1 to 9, the storage device 350 may identify the available buffer size and may report to the processor 310 on the available buffer size. The processor 310 may select one of the turbo write operation and the normal write operation, based on the available buffer size. The processor 310 may write data into the storage device 350 through the selected write operation.

As described with reference to FIG. 10, the storage device 350 may not separately report to the processor 310 on the available buffer size. The processor 310 may request a write operation from the storage device 350 without separation of the turbo write operation and the normal write operation.

The storage device 350 may store write data into the random access memory 320. When writing the data stored in the random access memory 320 into the nonvolatile memory device 210, the storage device 350 may select one of the turbo write operation and the normal write operation based on the available buffer size.

Figure 12:
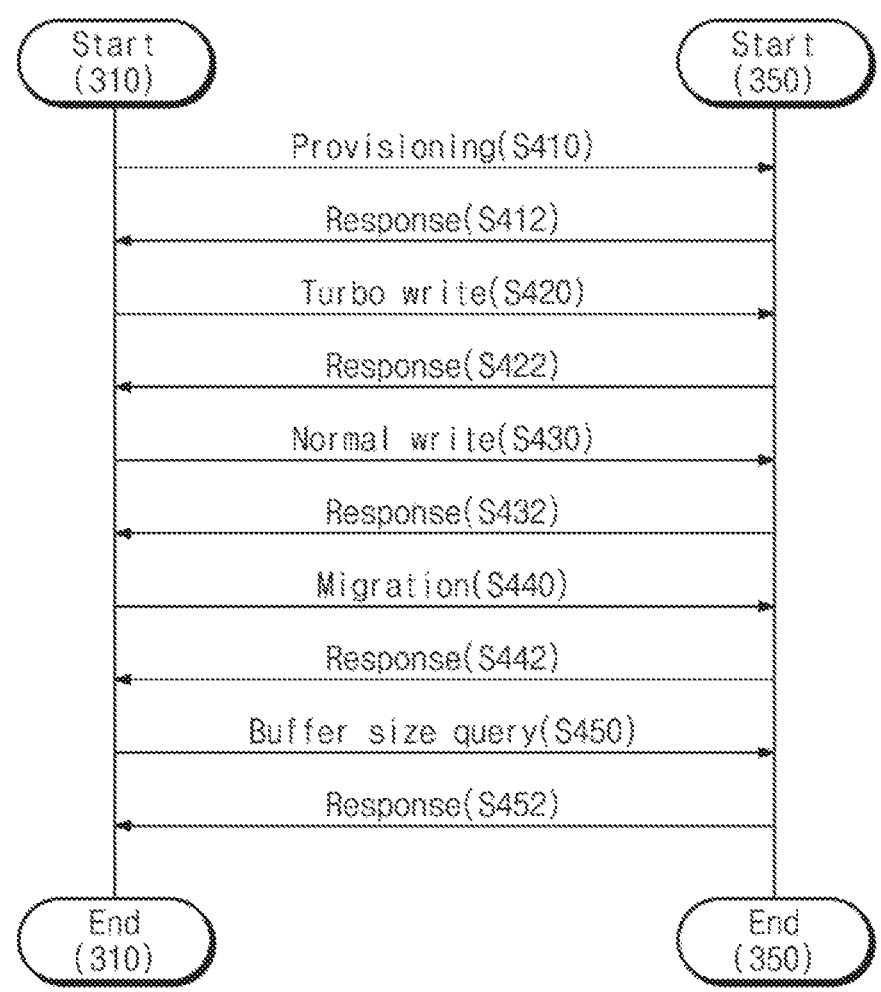
FIG. 12 illustrates a method of storing data performed between a processor and a storage device according to an embodiment.

FIG. 12 illustrates a method of storing data performed between the processor 310 and the storage device 350. In FIG. 12, the storage device 350 includes the storage device 100 described with reference to FIGS. 1 to 9. Referring to FIGS. 1, 11, and 12, in operation S410 and operation S412, the processor 310 and the storage device 350 may perform a provisioning operation.

For example, in operation S410, the processor 310 may request provisioning of the buffer area 212 from the storage device 350. The request of operation S410 may be performed by using a query request UFS protocol information unit (UPIU) based on a universal flash storage (UFS). The processor 310 may transmit a write descriptor query request UPIU to the storage device 350.

The write descriptor query request UPIU may include mode information, size information, and logical unit (LU) information. The mode information may indicate a way to generate the buffer area 212 and may include a reduction mode and a noreduction mode.

The size information may include information about the size of the buffer area 212. The LU information may indicate whether all LUs share the buffer area 212 in a state that the buffer area 212 is implemented with one LU of the storage device 350 or whether the buffer area 212 is implemented in each of LUs of the storage device 350. In operation S412, the storage device 350 may transmit a response UPIU to the processor 310. For example, the response UPIU may include an available buffer size of a buffer area.

Figure 13:
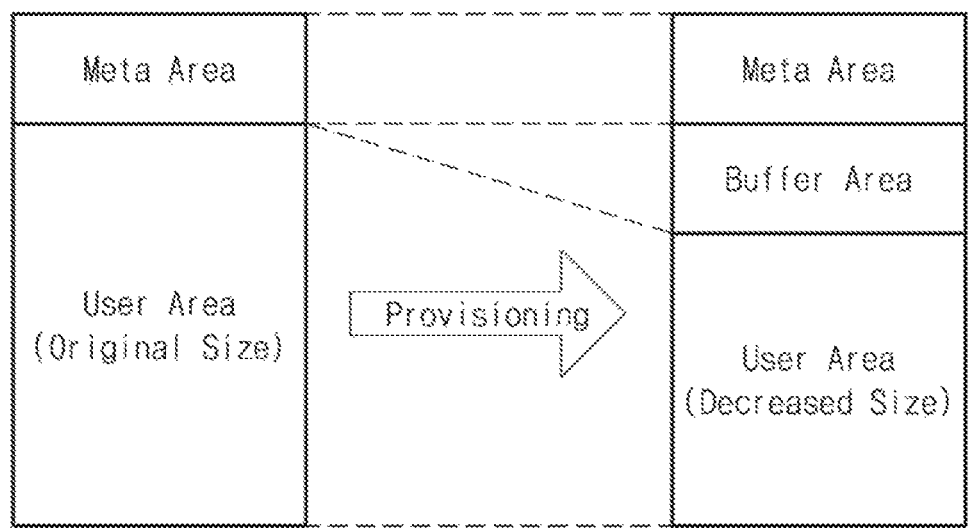
FIG. 13 illustrates a diagram in which a buffer area is allocated in a reduction mode when a storage device does not have an overprovision area according to an embodiment.

FIGS. 13 to 16 illustrate diagrams in which a provisioning operation is performed. For example, FIG. 13 illustrates a diagram in which a buffer area is allocated in a reduction mode when the storage device 350 does not have an overprovision (OP) area.

Referring to FIGS. 11 and 13, a storage space of the storage device 350 may be divided into a meta area and a user area. The meta area may be used for the storage device 350 to store metadata (e.g., a mapping table of logical addresses and physical addresses) necessary to manage the storage device 350. The meta area may not be accessible to the external host device (e.g., the processor 310).

The user area may be an area that the storage device 350 is accessible to the processor 310 and may be accessed for the processor 310 to write data. When the computing device 300 is initialized (or booted up), the storage device 350 may provide capacity information of the user area to the processor 310.

In the provisioning operation S410, the processor 310 may provide size information of the buffer area to the storage device 350. The storage device 350 may allocate an area, which corresponds to the size information, of the user area for the buffer area. That is, in the reduction mode, the size of the user area may be decreased to be smaller than an original size when the provisioning operation is performed. The buffer area may be allocated to be equal in size as the decrement of the user area.

The size of the buffer area may be fixed. Memory blocks that are selected as the buffer area may be physically fixed. That is, when rebooting and re-provisioning are performed, previously selected memory blocks may be consistently selected as the buffer area. According to the example of FIG. 13, a user area, which is allocated to write data, of the storage device 350 may decrease, while a buffer area supporting the turbo write operation may be stably secured.

Figure 14:
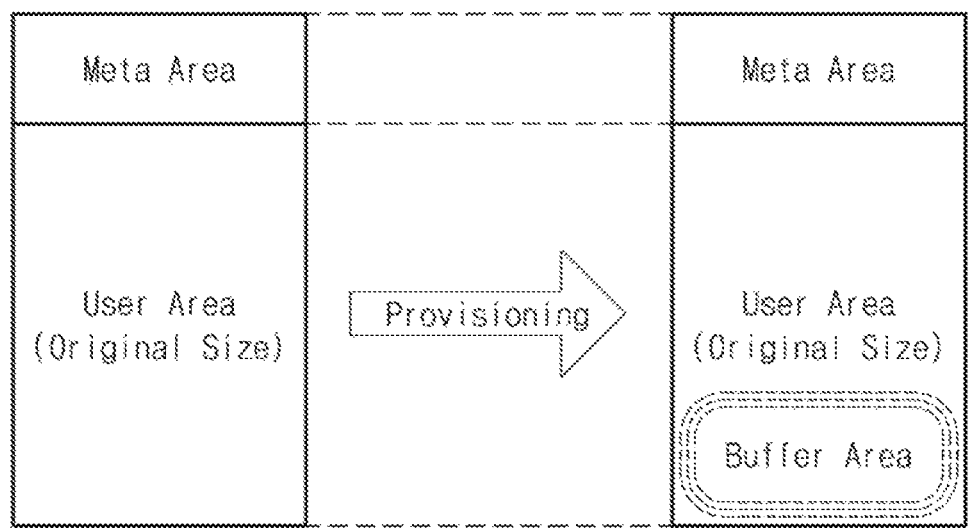
FIG. 14 illustrates a diagram in which a buffer area is allocated in a noreduction mode when a storage device does not have an overprovision area according to an embodiment.

FIG. 14 illustrates a diagram in which a buffer area is allocated in the noreduction mode when the storage device 350 does not have an overprovision (OP) area. Referring to FIGS. 11 and 14, in the provisioning operation, size information may include a maximum size of a buffer area. The size of the buffer area may vary with the size information.

The storage device 350 may provide an original size of a user area to the processor 310. The storage device 350 may adaptively or dynamically allocate a buffer area within the user area. For example, the storage device 350 may allocate memory blocks of the user area, in which data are not written, as the buffer area.

When data written in the user area do not exist, the storage device 350 may allocate the buffer area to have the maximum size. As data are written into the user area, the storage device 350 may decrease the size of the buffer area. For example, as a filling rate of the user area increases, the storage device 350 may decrease the size of the buffer area.

The buffer area may decrease to the minimum size of the size information. For example, the minimum size may be automatically determined by the storage device 350. As a filling rate of the user area decreases, the storage device 350 may increase the size of the buffer area. The storage device 350 may adaptively or dynamically select memory blocks to be included in the buffer area.

For example, the storage device 350 may adaptively select memory blocks to be included in the buffer area with reference to the age or degree of usage of the storage device 350 and the number of program/erase cycles of each of memory blocks. Memory blocks having the low (or high) degree of usage or the small (or large) number of program/erase cycles may be included in the buffer area.

The storage device 350 may differently manage a certain memory block, based on whether the certain memory block is included in the buffer area. For example, the storage device 350 may manage parameters such as a read count and the number of program/erase cycles of a memory block and may manage data by using the parameters.

The storage device 350 may differently set a weight to be applied to a read count and a weight to be applied to the number of program/erase cycles, based on whether a certain memory block is included in the buffer area. For example, a smaller (or greater) weight may be applied to a read count of a memory block belonging to the buffer area, and a smaller (or greater) weight may be applied to the number of program/erase cycles of the memory block belonging to the buffer area.

As described with reference to FIG. 14, the processor 310 may select the noreduction mode to perform the provisioning operation, thus effectively utilizing the original size of the user area of the storage device 350.

Figure 15:
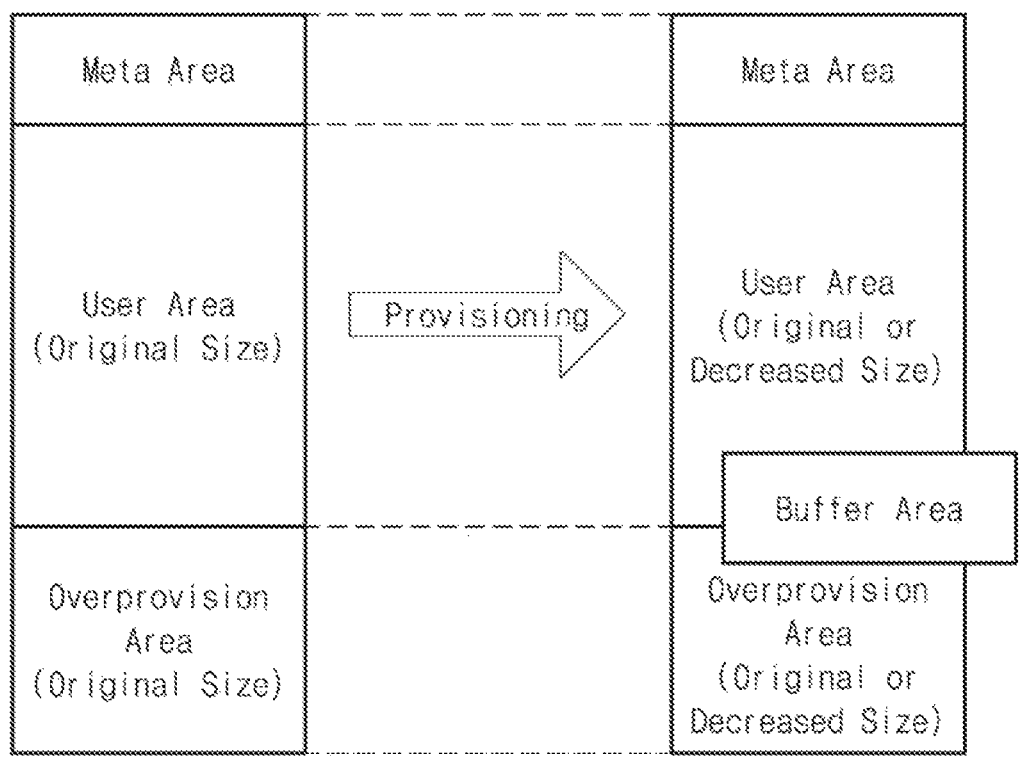
FIG. 15 illustrates a diagram in which a buffer area is allocated in a reduction mode when a storage device has an overprovision area according to an embodiment.

FIG. 15 illustrates a diagram in which a buffer area is allocated in a reduction mode when the storage device 350 has an overprovision (OP) area. Referring to FIGS. 11 and 15, the storage device 350 may have an overprovision area in addition to a meta area and a user area.

The overprovision area may be a storage space that is provided to improve the performance of the storage device 350. For example, in the case that free memory blocks in which data are not written exist, when a garbage collection operation or a read reclaim operation is performed on data written in the user area, the garbage collection operation and the read reclaim operation may be more quickly performed.

The storage device 350 may provide the user area to the external host device, and may integrally leverage the user area and the overprovision area to write and manage user data.

In the provisioning operation S410, the storage device 350 may fixedly allocate a portion of the user area or the overprovision area for a buffer area. A portion of the buffer area may be included in the overprovision area, and a remainder of the buffer area may be included in the user area. Accordingly, the user area or the overprovision area may have an original size or a decreased size.

Figure 16:
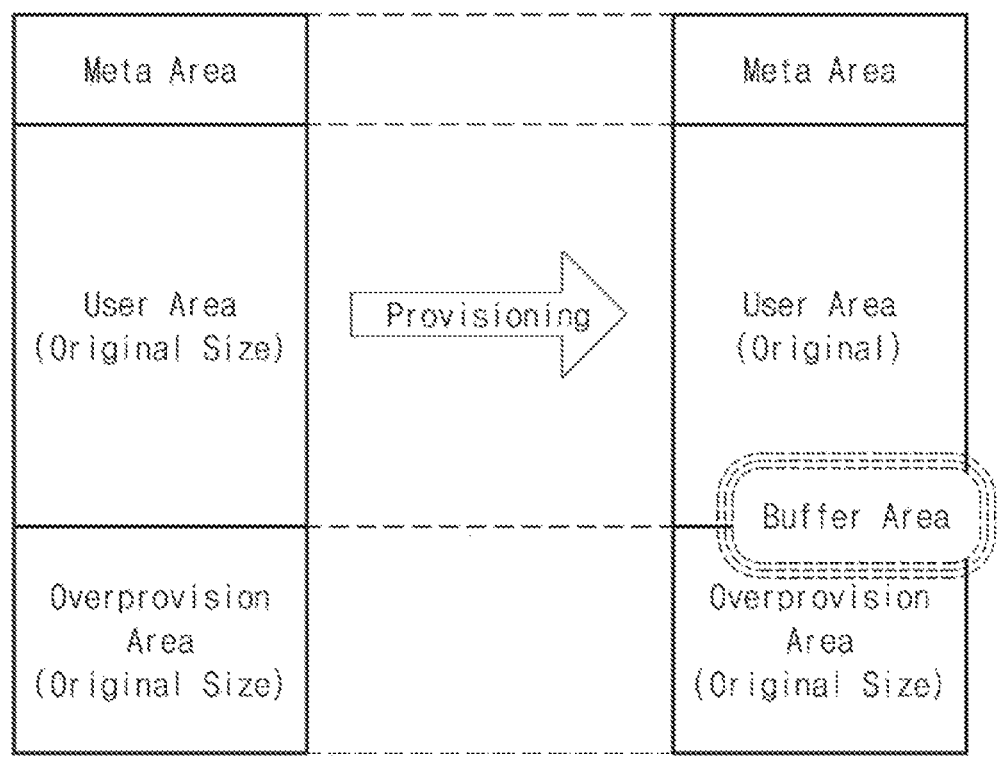
FIG. 16 illustrates a diagram in which a buffer area is allocated in a noreduction mode when a storage device has an overprovision area according to an embodiment.

FIG. 16 illustrates a diagram in which a buffer area is allocated in a noreduction mode when the storage device 350 has an overprovision (OP) area. Referring to FIGS. 11 and 16, the storage device 350 may have an overprovision area in addition to a meta area and a user area.

In the provisioning operation S410, the storage device 350 may maintain original sizes of the user area or the overprovision area. The storage device 350 may dynamically allocate the user area or the overprovision area for a buffer area. A portion of the buffer area may be included in the overprovision area, and a remainder of the buffer area may be included in the user area.

Returning to FIG. 12, in operation S420 and operation S422, the processor 310 and the storage device 350 may perform the turbo write operation. For example, in operation S420, the processor 310 may request the turbo write operation from the storage device 350.

For example, the request for the turbo write operation may use a write command UPIU based on the UFS. The write command UPIU may be identified as the request for the turbo write operation by setting a group number of the write command UPIU to a certain value, for example, "0x11." The storage device 350 may write data into the buffer area 112 in response to the write command UPIU having the group number of "0x11." In operation S422, the storage device 350 may transmit the response UPIU to the processor 310.

In operation S430 and operation S432, the processor 310 and the storage device 350 may perform the normal write operation. For example, in operation S430, the processor 310 may request the normal write operation from the storage device 350.

For example, the request for the normal write operation may use the write command UPIU based on the UFS. The storage device 350 may write data into the user area 111 in response to the write command UPIU. In operation S432, the storage device 350 may transmit the response UPIU to the processor 310.

In operation S440, the processor 310 and the storage device 350 may perform a migration operation or may set the migration operation. For example, in operation S440, the processor 310 may request the migration operation from the storage device 350. The request for the migration operation may be performed by using the query request UPIU based on the UFS.

For example, the processor 310 may transmit a set flag query request UPIU to the storage device 350. The set flag query request UPIU may include flush information or hibernation information. When the set flag query request UPIU includes the flush information, the storage device 350 may perform the migration operation, which is described with reference to FIG. 7, in response to the set flag query request UPIU.

When the set flag query request UPIU includes the hibernation information, the storage device 350 may change migration settings. For example, in response to the set flag query request UPIU, the storage device 350 may change the migration settings such that the migration operation is autonomously performed in the hibernation mode or such that the autonomous migration operation is not performed.

In operation S442, the storage device 350 may transmit the response UPIU to the processor 310. For example, the response UPIU may include the available buffer size. That is, when the migration operation is completed, the storage device 350 may identify the available buffer size and may report to the processor 310 on the available buffer size.

In operation S450 and operation S452, the processor 310 and the storage device 350 may perform a buffer size query operation. For example, in operation S450, the processor 310 may query to the storage device 350 to obtain the buffer size. The query about the buffer size may be performed by using a query request based on the UFS.

For example, the processor 310 may transmit a read attributes query request UPIU to the storage device 350. In operation S452, the storage device 350 may transmit the response UPIU to the processor 310. The response UPIU may include the available buffer size. For example, in response to the read attributes query request UPIU, the storage device 350 may identify the available buffer size and may provide an indication of the available buffer size to the processor 310.

In an embodiment, as described with reference to FIG. 10, when the storage device 350 includes the random access memory 320, the turbo write operation, the normal write operation, and the migration operation that are described with reference to FIG. 12 may be autonomously performed by the controller 220. As described with reference to FIG. 12, the storage device 350 may perform the provisioning operation in response to a request of the processor 310. The buffer size query operation may be omitted.

Figure 17:
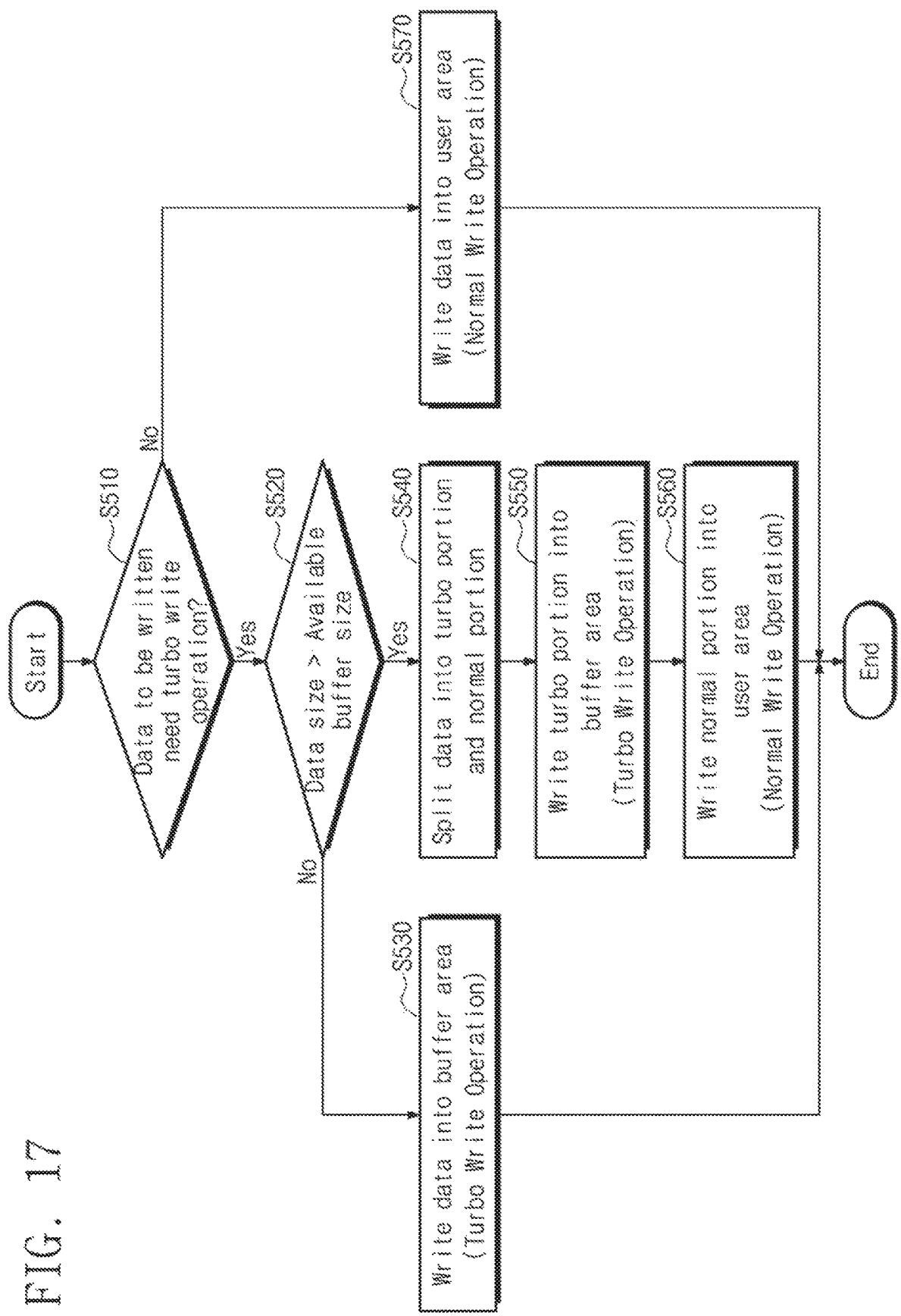
FIG. 17 illustrates a method of a processor writing data into a storage device according to an embodiment.

FIG. 17 illustrates a method of the processor 310 writing data into the storage device 350. Referring to FIGS. 1, 11, and 17, in operation S510, the processor 310 may determine whether data to be written requires the turbo write operation. For example, when data to be written require a write operation for a large amount of data, such as video data, the processor 310 may determine that the data to be written requires the turbo write operation.

When the data to be written requires the turbo write operation, in operation S520, the processor 310 may determine whether the size of the data to be written is greater than the available buffer size. When the size of the data to be written is not greater than the available buffer size, in operation S530, the processor 310 may perform the turbo write operation of writing data into the buffer area 112.

When the size of the data to be written is greater than the available buffer size, in operation S540, the processor 310 may divide the data into a turbo portion and a normal portion. In operation S550, the processor 310 may perform the turbo write operation of writing the turbo portion of the data into the buffer area 112.

In operation S560, the processor 310 may perform the normal write operation of writing the normal portion of the data into the user area 111. That is, the processor 310 may split the data to be written and may write the split portions into the storage device 350 through the turbo write operation and the normal write operation.

When it is determined in operation S510 that the data to be written do not require the turbo write operation, in operation S570, the processor 310 may perform the normal write operation of writing the data into the user area 111 of the storage device 350.

As described with reference to FIG. 10, when the storage device 350 includes the random access memory 320, the method described with reference to FIG. 17 may be autonomously performed by the controller 220.

Figure 18:
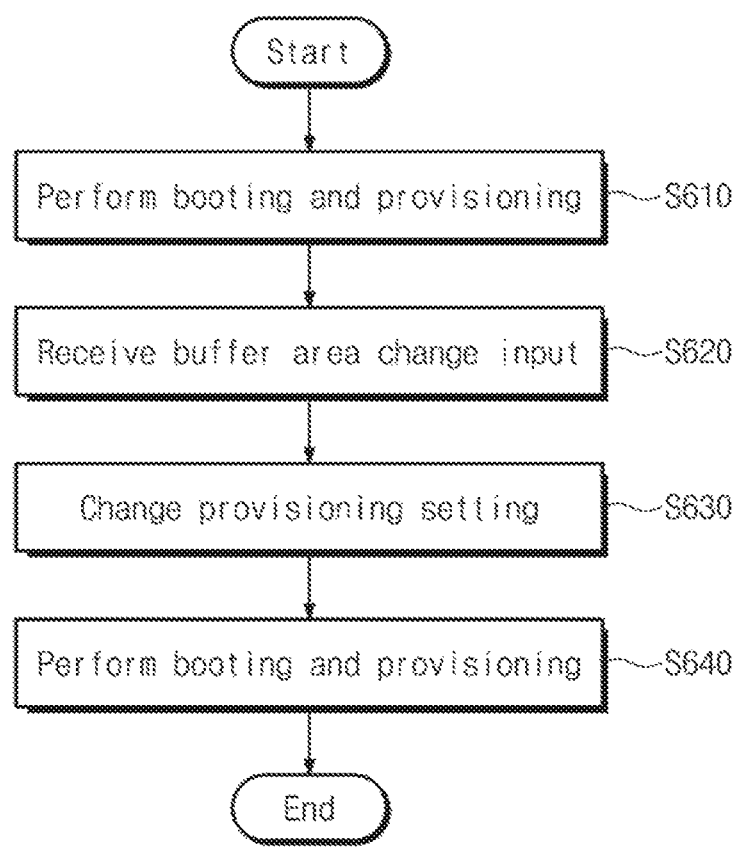
FIG. 18 illustrates a method of a computing device changing a size of a buffer area according to an embodiment.

FIG. 18 illustrates a method of the computing device 300 changing a size of a buffer area. Referring to FIGS. 1, 11, and 18, in operation S610, the computing device 300 may perform booting when power is supplied and provisioning, as described above. For example, the processor 310 may perform the provisioning operation with the storage device 350, based on the size of the buffer area of the existing provisioning settings. Afterwards, the computing device 300 may execute an operating system and applications under control of a user.

In operation S620, the computing device 300 may receive a buffer area change input. For example, the computing device 300 may receive the buffer area change input from the user through the user interface 340. In operation S630, in response to the buffer area change input, the processor 310 may update the size of the buffer area of the provisioning settings.

Afterwards, in operation S640, the computing device 300 may again perform booting and provisioning. For example, the processor 310 may perform the provisioning operation with the storage device 350, based on the size of the buffer area of the updated provisioning settings.

As described above, the computing device 300 may change the size of the buffer area, based on an input of the user. Changing the size of the buffer area may accompany rebooting and re-provisioning. As the change of the size of the buffer area is permitted, the computing device 300 may provide greater flexibility to the user.

When the size of the buffer area increases, an existing memory block that has been used as the user area may be utilized as the buffer area. When the size of the buffer area decreases, an existing memory block that has been utilized as the buffer area may be used as the user area.

The storage device 350 may differently manage a certain memory block, based on whether the certain memory block is included in the buffer area. For example, the storage device 350 may manage parameters such as a read count and the number of program/erase cycles of a memory block and may manage data by using the parameters.

The storage device 350 may differently set a weight to be applied to a read count and a weight to be applied to the number of program/erase cycles, based on whether a certain memory block is included in the buffer area. For example, a smaller (or greater) weight may be applied to a read count of a memory block belonging to the buffer area, and a smaller (or greater) weight may be applied to the number of program/erase cycles of the memory block belonging to the buffer area.

As described above, components of the storage device 100 or 200 and the computing device 300 are described by using the terms "first," "second," "third," and the like. However, the terms "first," "second," "third," and the like may be used to distinguish components from each other and do not limit the descriptions thereof. For example, the terms "first," "second," "third," and the like do not involve an order or a numerical meaning of any form.

In the above embodiments, components according to embodiments are described by using blocks. The blocks may be implemented with various hardware devices, such as an integrated circuit, an application certain IC (ASCI), a field programmable gate array (FPGA), and a complex programmable logic device (CPLD), firmware driven in hardware devices, software such as an application, or a combination of a hardware device and software. Also, the blocks may include circuits enrolled as circuits or semiconductor elements in an integrated circuit.

According to the embodiments, an available buffer size of a buffer area is identified based on whether a reuse time elapses after a memory block of the buffer area is erased. Accordingly, a storage device and a computing device capable of preventing an error from occurring in the buffer area due to frequent erase operations and providing improved reliability are provided.

While the concepts above have been described with reference to exemplary embodiments thereof, it will be apparent to those of ordinary skill in the art that various changes and modifications may be made thereto without departing from the spirit and scope of the concepts as set forth in the following claims.

What is claimed is:

1. A storage device comprising:
a nonvolatile memory device including a plurality of memory blocks; and
a controller configured to use some memory blocks of the plurality of memory blocks as a buffer area and other memory blocks of the plurality of memory blocks as a memory area,
wherein memory blocks of the buffer area storing invalid data that is migrated from the buffer area to the memory area are invalid memory blocks, and
wherein the controller is further configured to:
identify memory blocks of the buffer area, of which an elapsed time after erase is greater than a reuse time, from among the invalid memory blocks as a size of an available buffer for storing data of memory commands received from an external host device; and
provide the available buffer size to the external host device.

2. The storage device of claim 1, wherein the controller is configured to check the invalid memory blocks in response to a request of the external host device or periodically and update the available buffer size based on a result of the available buffer size.

3. The storage device of claim 1, wherein the controller is configured to provide the available buffer size to the external host device in response to a read attributes query request UPIU (UFS protocol information unit) based on universal flash storage (UFS) received from the external host device.

4. The storage device of claim 1, wherein the controller is configured to:

receive a write command, an address, and data from the external host device;
write the data into the buffer area when the write command is a turbo write command;
write the data at a location, which the address indicates, of the memory area when the write command is a normal write command.

5. The storage device of claim 4, wherein the turbo write command and the normal write command have different group numbers in a write command UPIU based on an UFS.

6. The storage device of claim 4, wherein the turbo write command includes:
a set flag query request UPIU based on an UFS activating a turbo write operation; and
a write command UPIU based on the UFS.

7. The storage device of claim 4, wherein, in response to a request of the external host device or in a hibernation mode, the controller is further configured to:
migrate valid data written from the buffer area to the location, which the address indicates, of the memory area; and
invalidate the valid data in the buffer area.

8. The storage device of claim 7, wherein the request of the external host device includes a set flag query request UPIU based on an UFS.

9. The storage device of claim 7, wherein the controller is configured to migrate the valid data when the hibernation mode is activated and deactivated according to a set flag query request UPIU based on an UFS.

10. The storage device of claim 1, wherein the controller is further configured to:
provide a capacity of the plurality of memory blocks to the external host device in a booting operation;
receive a provisioning command including capacity information of the buffer area from the external host device; and
select the buffer area based on the capacity information.

11. The storage device of claim 10, wherein the provisioning command further includes mode information, and
wherein, when the mode information indicates a reduction mode, the controller is further configured to provide a storage capacity of remaining memory blocks of the memory area to the external host device as a user accessible area.

12. The storage device of claim 11, wherein the controller fixedly selects the buffer area, uses memory cells of the buffer area as single level cells, and uses memory cells of the memory area as at least triple level cells.

13. The storage device of claim 10, wherein the provisioning command further includes mode information, and
wherein, when the mode information indicates a noreduction mode, the controller is further configured to provide a storage capacity of the plurality of memory blocks to the external host device as a user accessible area.

14. The storage device of claim 13, wherein the controller adaptively selects the buffer area, uses memory cells of the buffer area as single level cells, and uses memory cells of the memory area as at least triple level cells.

15. The storage device of claim 14, wherein the capacity information indicates a maximum capacity of the buffer area, and
wherein the controller is further configured to change a number of memory blocks included in the buffer area within a range of less than or equal to the maximum capacity.

16. The storage device of claim 15, wherein the controller changes the number of the memory blocks included in the buffer area in proportion to a ratio of a capacity of data written into the user accessible area to a capacity of the user accessible area.

17. A storage device comprising:
a nonvolatile memory device, the nonvolatile memory device comprising a plurality of memory blocks configured as a user area comprising first memory blocks among the plurality of memory blocks and a buffer area comprising second memory blocks among the plurality of memory blocks; and
a controller configured to:
receive a write command to write data to the nonvolatile memory device, the write command comprising a turbo write command of a turbo write operation to write the data into the user area through the buffer area,
write the data to the nonvolatile memory device through the buffer area according to the turbo write operation of the turbo write command based on identifying that a size of the data does not exceed an available buffer size of the buffer area, the available buffer size of the buffer area comprising a size of available memory blocks among the second memory blocks of which a period of time between a time of erasing stored data stored in the available memory blocks of the buffer area from the available memory blocks and a current time exceeds a predetermined time, and
write the data to the nonvolatile memory device according to a normal write operation of a normal write command to write the data directly into the user area based on identifying that the size of the data exceeds the available size of the buffer area.

18. The storage device of claim 17, further comprising:
a random access memory,
wherein the controller reads the data from the random access memory and writes the data into the nonvolatile memory device.

19. A computing device comprising:
a storage device including a buffer area and a user area, and configured to output a size of a storage space, of which an elapsed time after erase is greater than a reuse time, of the buffer area, as an available buffer size; and
a processor, wherein the processor is configured to:
receive the available buffer size;
transmit data, which require a turbo write operation and a size of which is smaller than the available buffer size, to the storage device together with a turbo write command; and
transmit data, which do not require the turbo write operation, to the storage device together with a normal write command.

20. The computing device of claim 19, wherein the processor is further configured to:
split the data, which require the turbo write operation and the size of which is larger than the available buffer size, into a turbo portion having the available buffer size and a normal portion;
transmit the turbo portion to the storage device together with the turbo write command; and
transmit the normal portion to the storage device together with the normal write command.

* * * * *